(12) United States Patent  
Hedayat

(10) Patent No.: US 11,464,044 B2
(45) Date of Patent: Oct. 4, 2022

(54) WIRELESS CHANNEL MONITORING, ACQUISITION, AND ALIGNMENT

(71) Applicant: Charter Communications Operating, LLC, St. Louis, MO (US)

(72) Inventor: Ahmad Reza Hedayat, Aliso Viejo, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/117,782

(22) Filed: Dec. 10, 2020

(65) Prior Publication Data

US 2022/0191920 A1    Jun. 16, 2022

(51) Int. Cl.
*H04W 74/00* (2009.01)
*H04W 24/08* (2009.01)
*H04W 48/08* (2009.01)
*H04W 72/04* (2009.01)
*H04W 72/08* (2009.01)

(52) U.S. Cl.
CPC ......... *H04W 74/006* (2013.01); *H04W 24/08* (2013.01); *H04W 48/08* (2013.01); *H04W 72/0446* (2013.01); *H04W 72/085* (2013.01)

(58) Field of Classification Search
CPC ... H04W 74/006; H04W 24/08; H04W 48/08; H04W 72/0446; H04W 72/085
See application file for complete search history.

(56) References Cited

U.S. PATENT DOCUMENTS

| 5,452,290 A | 9/1995 | Mihm, Jr. |
| 10,333,656 B2 | 6/2019 | Andreoli-Fang et al. |
| 2004/0076174 A1 | 4/2004 | Baum |
| 2015/0003469 A1 | 1/2015 | Martinez |
| 2016/0360553 A1 | 12/2016 | Cheng et al. |
| 2017/0019909 A1 | 1/2017 | Si et al. |
| 2017/0202022 A1 | 7/2017 | Kannan et al. |
| 2017/0223677 A1 | 8/2017 | Dinan et al. |
| 2017/0265208 A1 | 9/2017 | Zeng et al. |
| 2017/0265225 A1 | 9/2017 | Takeda et al. |
| 2017/0290048 A1 | 10/2017 | Amuru et al. |
| 2017/0332358 A1 | 11/2017 | Park et al. |
| 2017/0374680 A1 | 12/2017 | Chen et al. |
| 2018/0199376 A1 | 7/2018 | Kim |
| 2018/0270860 A1 | 9/2018 | Bhorkar et al. |
| 2018/0288805 A1 | 10/2018 | Bhorkar et al. |
| 2019/0013909 A1 | 1/2019 | Li et al. |
| 2019/0053276 A1 | 2/2019 | Karaki et al. |
| 2019/0075581 A1 | 3/2019 | Salem et al. |
| 2019/0182866 A1 | 6/2019 | Li et al. |
| 2019/0334666 A1 | 10/2019 | Damnjanovic et al. |

(Continued)

FOREIGN PATENT DOCUMENTS

WO    WO-2019060307 A1 * 3/2019 ........... H04B 7/0408

OTHER PUBLICATIONS

Partial International Search, PCT/US2021/062135, dated Mar. 22, 2022, pp. 1-13.

(Continued)

*Primary Examiner* — Ayanah S George

(74) *Attorney, Agent, or Firm* — Armis IP Law, LLC

(57) ABSTRACT

A system includes multiple techniques of implementing listen before talk functionality to provide multiple mobile communication devices connectivity with a wireless base station.

21 Claims, 24 Drawing Sheets

(56) References Cited

U.S. PATENT DOCUMENTS

| | | |
|---|---|---|
| 2019/0373608 A1 | 12/2019 | Weiss et al. |
| 2020/0107361 A1 | 4/2020 | Mukherjee |
| 2020/0107364 A1* | 4/2020 | Xue .................. H04W 74/0808 |
| 2020/0145169 A1 | 5/2020 | Zhou et al. |
| 2020/0221504 A1 | 7/2020 | Cirik et al. |
| 2020/0275485 A1 | 8/2020 | Babaei et al. |
| 2020/0275490 A1 | 8/2020 | Li et al. |
| 2021/0392680 A1 | 12/2021 | Wang |

OTHER PUBLICATIONS

R1-1805923; 3GPP TSG RAN WG1 Meeting #93, Busan, Korea May 21 st-25th, 2018; Source: vivo; Title: Discussion on the channel access procedures; Agenda Item 7.6.4.1; (Year: 2018), pp. 1-4.

R1-1806462 Discussion on Channel access mechanism for NR-U; 3GPP TSG RAN WG1 Meeting #93; Busan, Korea, May 21-25, 2018; Title: "Discussion on channel access mechanism for NR-U; Source: ZTE; Agenda Item 7.6.1 "(Year: 2018), pp. 1-6.

R1-1806569, channel access for NR unlicensed operations: 3GPP TSG RAN WG1 Meeting #93; Busan, Korea, May 21-25, 2018; Agenda Item 7.6.4,1; Source: LG Electronics; Title: Channel access procedure for NR unlicensed operation; (Year: 2018), pp. 1-4.

R1-1806645; 3GPP TSG RAN WG1 Meeting #93; Busan, Korea, May 21 st-25th, 2018: Agenda Item: 7.6.4.1; Source LG Electronics; Title: Channel access procedure for NR unlicensed operation; (Year: 2018), pp. 1-6.

R1-1806761—Channel access; 3GPP TSG-RAN WG1 Meeting #93, Busan, Korea, May 21 st-25th; 2018; Agenda item: 7.6.4.1; Source: Samsung; Title: Channel access procedure for NR-U; Document for: Discussion and Decision (Year: 2018), pp. 1-5.

R1-1806968 (R15 NR WI AI 765 -BWP for NR-U); 3GPP RAN WG1 Meeting #92bis; Sanya, China, Apr. 16-20, 2018, Agenda item: 7.6.5; Source: InterDigitai Inc.; Title: BWP operation in unlicensed spectrum; Document for Discussion: (Year 2018), pp. 1-4.

R2-1806837 (R15—NRU SI AI 112 scheduling)—InterDigitai: 3GPP TSG-RAN WG2 Meeting #102; Busan, Korea, May 21-25, 2018 (Revision of R2-1804825); Agenda Item: 11.2; Source: interDigital Inc.; Title: Scheduling enhancements for NR-based access to unlicensed spectrum; (Year 2018), pp. 1-4.

R1-1806086; 3GPP TSG RAN WG1 Meeting #93R1-1806086; Busan, Korea, May 21-25, 2018; Source: vivo; Title: Discussion on the chanel access procedures; Agenda Item 7.6.4.1; (Year: 2018), pp. 1-5.

\* cited by examiner

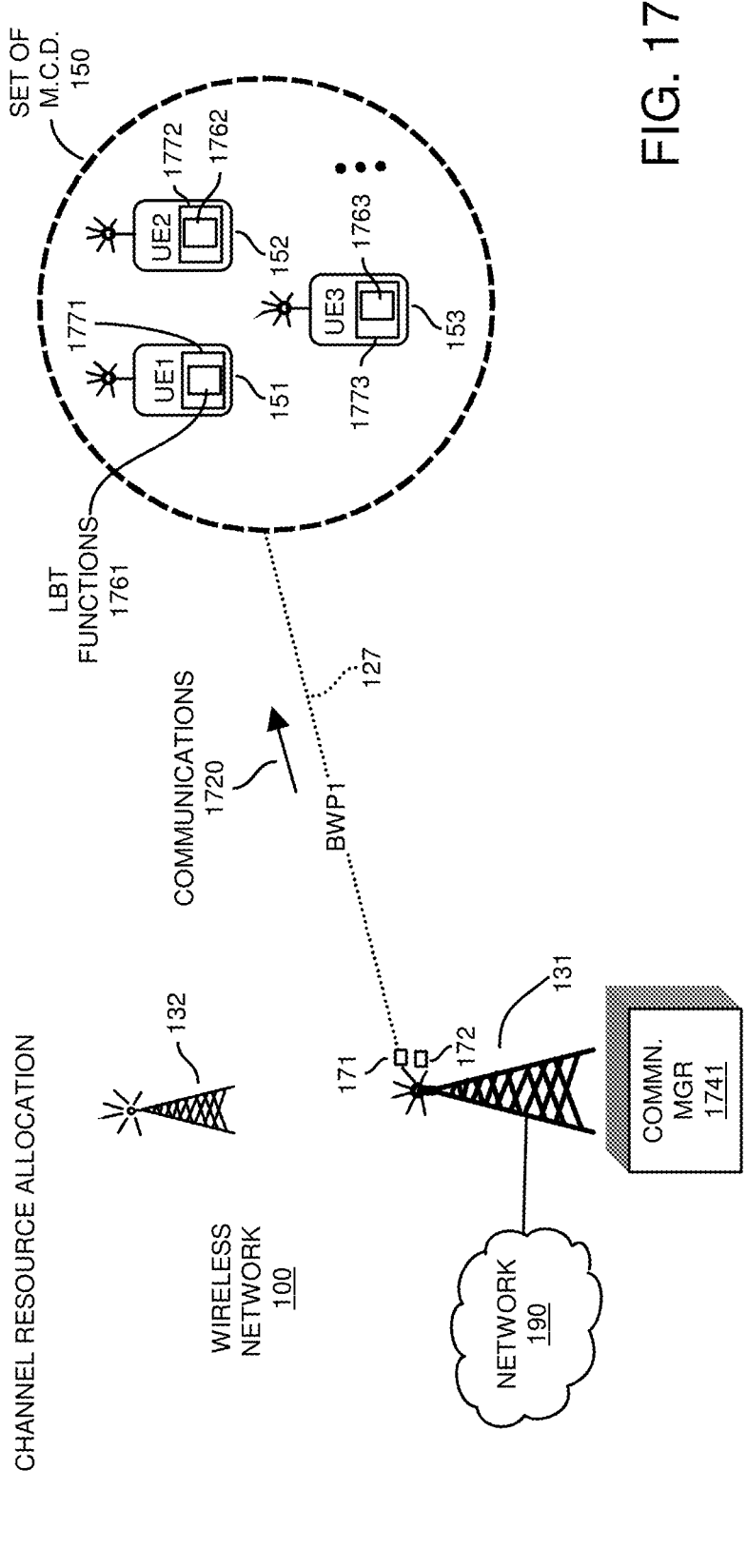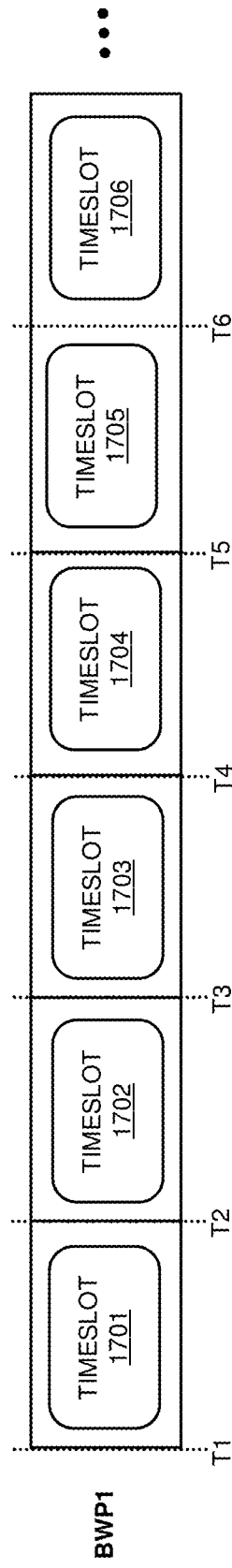
FIG. 17

WIRELESS CHANNEL MONITORING, ACQUISITION, AND ALIGNMENT

BACKGROUND

In general, a conventional listen before talk (a.k.a., LBT) protocol includes monitoring a wireless channel or narrow bandwidth before initiating wireless transmissions from a respective wireless station.

For example, if a power level of wireless communications in a monitored bandwidth is below a threshold value, the corresponding wireless station assumes that the monitored bandwidth is not being used by other devices in which case the corresponding wireless station then communicates over the available bandwidth during the respective acquired channel occupancy time.

Thus, conventional LBT techniques can be used by a radio device to determine that a network that is free for use by the monitoring wireless station implementing the listen before talk procedure.

In the 5 GHz and 6 GHz unlicensed spectrum, a node accessing a channel has to perform listen-before-talk (LBT) over either a fixed short duration, or over a longer and random duration. Such an LBT mechanism enhances coexistence among nodes attempting to transmit on the same channel of the unlicensed spectrum.

It is note that implementing listen before talk techniques also adds to the channel access delay, and the overall delay budget of being able to communicate a data payload.

Conventional LBT categories vary based on the listen interval or back-off time that is required to access a channel. For example, so-called LBT Cat2 (Category 2) requires a fixed duration of time of 25 µs, while LBT Cat4 (Category 4) requires a listen interval with a value that is randomly drawn from a range of (Lmin, Lmax) where the values of Lmin/Lmax are specified by regulators or standardization bodies.

If a device (node) performing LBT, for a given back-off interval, detects no signal stronger than a respective energy detect threshold (EDT), the device assumes the channel is available for access.

In 3GPP NR (New Radio), bandwidth part (BWP) operation is described as transmission/reception of signals in a portion of bandwidth, where one or more of such portions can be configured by a gNB (gnodeB) for respective UE (User Equipment).

In the baseline NR specification, a gNB may define any portion of the available bandwidth to be a so-called BWP (BandWidth Part). However, in NR-U (New Radio-Unlicensed), due to regulatory requirement for channel sensing and LBT across a 20 MHz portion of the channel, it is more efficient if the BWPs are defined as multiples of 20 MHz.

BRIEF DESCRIPTION OF EMBODIMENTS

This disclosure includes the observation that conventional techniques of implementing shared use of wireless bandwidth suffer from deficiencies. For example, conventional techniques of monitoring the overall power level in a wireless network environment only indicate usage of the particular wireless channel and not what type of device or protocol is used by currently transmitting devices.

To access a BWP, a wireless communication device/gNB/ UE has to perform channel sensing and an LBT (Listen Before Talk) procedure. A gNB may configure multiple BWPs and assign each UE to one (or more) of the configured BWPs. This way, the gNB (wireless base station) may serve a set of UEs in one BWP and serve another set of UEs in another BWP. The first and second sets of UEs may be independent or disjoint sets.

In order to enhance a successful channel access in an unlicensed spectrum, an NR-U (New Radio-Unlicensed) gNB may attempt to access multiple BWPs (bandwidth parts) at the same time. However, due to presence of various competing co-channel devices in each BWP, a successful channel access (after a successful completion of one of the LBT categories) is not deterministic.

Hence, it may occur with conventional techniques that a gNB attempts to access two BWPs at the same time, but it does not succeed to access both at the same time. For example, the gNB accesses BWP1 (first bandwidth) first and after some time, e.g., two slots, it succeeds to access BWP2 (second bandwidth).

In this disclosure, methods to access multiple BWPs are described to:
  enhance the chance of a successful channel access and simultaneous usage of bandwidth and/or multiple bandwidth parts
  temporally align user equipment (mobile communication devices) to reduce the difficulty of a gNB to transmit wireless communications on one BWP and receive wireless communications on another bandwidth portion (a.k.a., bandwidth part).
  support medium (wireless channel) sharing amongst multiple different mobile communication devices (user equipment) while accessing a BWP

First Embodiments

Embodiments herein provide improved monitoring of a shared wireless spectrum (such as wireless channel, wireless bandwidth, etc.) and use of same. In one embodiment, the wireless base station aligns use of first wireless bandwidth and second wireless bandwidth to simultaneously (such as in the same time slot) communicate in an uplink direction from one or more mobile communication devices to the wireless base station. Embodiments herein also support aligning communications in a downlink direction from the wireless base station over different wireless channels (bandwidth or bandwidth parts) to different mobile communication devices.

More specifically, one embodiment herein includes a wireless base station. The wireless base station monitors, via first and second listen before talk operations, both a first bandwidth and a second bandwidth to transmit wireless communications in a network environment. Based on the monitoring, the wireless base station receives access rights to use the first bandwidth prior to receiving access rights to use the second bandwidth. Via communication of one or more wireless messages over the first bandwidth, the wireless base station temporally (i.e., in the time domain) aligns use of the first bandwidth and the second bandwidth such as to communicate in the same direction in a given time slot.

In one embodiment, the wireless base station uses (communicates over) the first wireless bandwidth to prevent another wireless station from acquiring and using the first wireless bandwidth while the wireless base station continues to implement a respective listen before talk procedure and acquire the second wireless bandwidth. Eventually, the wireless base station acquires the second bandwidth and efficiently uses both the first bandwidth and the second bandwidth to support wireless connectivity amongst multiple wireless stations.

In accordance with further embodiments, the wireless message from the wireless base station (such as connection management resource) over the bandwidth to the mobile communication device is a grant of use message indicating grant of use of the first bandwidth to the first mobile communication device. The wireless base station communicates the grant of use message to the first mobile communication device over a wireless communication link. In one embodiment, the wireless base station communicates the grant of use message to the first mobile communication device in a window of time between a time of the wireless base station receiving the access rights to use the first bandwidth and the wireless base station receiving the access rights to use the second bandwidth.

In accordance with further example embodiments, the grant of use of the first bandwidth by the first mobile communication device (in the first time slot) prevents a competing wireless station from obtaining access rights to the first bandwidth in the window of time (such as first time slot).

In accordance with still further example embodiments, the wireless base station or (other suitable management entity) assigns the first bandwidth (such as first bandwidth part) for use by a first set of mobile communication devices in communication with the wireless base station, the first set of mobile communication devices includes the first mobile communication device. Additionally, the wireless base station (other suitable management entity) assigns the second bandwidth (such as second bandwidth part) for use by a second set of mobile communication devices in communication with the wireless base station.

In further example embodiments, the wireless message from the wireless base station to the mobile communication device indicates a grant of use of the first bandwidth to the mobile communication device. In one embodiment, the wireless base station communicates the wireless message in with first time slot from the wireless base station to the first mobile communication device over a wireless communication link; the wireless message indicates allocation of the first bandwidth (configuration grant) to the first mobile communication device to communicate in an uplink direction from the mobile communication device to the wireless base station. Additionally, the wireless base station does not yet have access rights to use the second bandwidth in the first time slot.

In a second time slot following the first time slot, via wireless communication of a revoke grant message from the wireless base station over the first bandwidth to the mobile communication device (wireless station), the wireless base station revokes the grant of use of the first wireless bandwidth to the first mobile communication device as indicated by the previously sent wireless message. Communications in the first time slot prevents another wireless station from acquiring the first bandwidth (first wireless channel). In one embodiment, the revoked grant of use indicates deallocation of a prior channel grant such as that the first bandwidth from the first mobile communication device to communicate in an uplink direction from the mobile communication device to the wireless base station. In accordance with further example embodiments, the wireless base station has access rights to use both the first bandwidth and the second bandwidth in the second time slot.

In one embodiment, the wireless system as described herein is implemented in an NR-U wireless communication system.

Further embodiments herein include, via the wireless base station, communicating the wireless message from a wireless base station over a control channel monitored by multiple mobile communication devices that shares use of the first bandwidth.

Note further that embodiments herein are useful over conventional techniques of wireless stations competing for use of available wireless bandwidth. For example, the operations performed by the wireless base station (i.e., connection management resource) enables the wireless base station to align uplink communications in the same time slots without losing an acquired wireless channel, increasing efficiency and overall use of limited available wireless bandwidth.

Second Embodiments

Further embodiments herein provide improved monitoring of a shared wireless spectrum (such as wireless channel, wireless bandwidth, etc.) and more efficient use of same.

More specifically, embodiments herein include communication management hardware associated with a wireless (base) station. During operation, the communication management hardware associated with the wireless base station monitors a first bandwidth to acquire corresponding access rights via implementation of a first listen before talk function assigned a first listen before talk time duration. The communication management hardware also monitors a second bandwidth to acquire corresponding access rights via implementation of a second listen before talk function assigned a second listen before talk time duration. In one embodiment, the communication management hardware acquires access rights to both the first bandwidth and the second bandwidth in response to detecting that wireless signals in both the first bandwidth and the second bandwidth are below respective energy threshold levels during the first listen before talk time duration.

In accordance with further example embodiments, the first listen before talk time duration is less than the second listen before talk time duration.

In still further example embodiments, the respective threshold levels implemented by the first listen before talk function and the second listen before talk function include a first wireless energy threshold level and a second wireless energy threshold level. The first wireless energy threshold level is used by the first listen before talk function to monitor availability the first bandwidth. The second wireless energy threshold level is used by the second listen before talk function to monitor availability of the second bandwidth.

In one embodiment, the second wireless energy threshold level associated with monitoring the second wireless bandwidth is lower (less) than the first wireless energy threshold level associated with monitoring the first wireless bandwidth.

In accordance with further example embodiments, acquiring access rights to both the first bandwidth and the second bandwidth is dependent, at least in part, upon a bandwidth separation between the first bandwidth and the second bandwidth.

In yet further example embodiments, the first bandwidth is a first component carrier; the second bandwidth is a second component carrier. Acquisition of the access rights to both the first bandwidth and the second bandwidth includes carrier aggregation of the first component carrier and the second component carrier by the respective wireless station to communicate in the wireless network environment.

In still further example embodiments, the spacing between a center carrier frequency of the first bandwidth and a center carrier frequency the second bandwidth is greater than a predetermined threshold value such as 100 MHz, 200

MHz, 300 MHz, etc. In other words, the spacing can be any suitable threshold value. In one embodiment, acquisition of the access rights to both the first bandwidth and the second bandwidth includes communicating a message indicating acquisition of the first bandwidth from a first listen before talk function that monitors the first bandwidth to a second listen before talk function that monitors the second bandwidth.

In still further example embodiments, acquisition of the access rights by the communication management hardware associated with the wireless base station includes, via the first listen before talk function, producing a first signal indicative of a first wireless power (energy) level of receiving communications in the first bandwidth. The first listen before talk function compares the first signal to a first threshold level to determine availability of the first wireless bandwidth. Further embodiments herein include, via the second listen before talk function, producing a second signal indicative of a second wireless power (energy) level of receiving communications in the second bandwidth. The second listen before talk function compares the second signal to a second threshold level.

In accordance with further example embodiments, the level/threshold that a second listen before talk function uses to monitor usage of a second bandwidth part can be configured to depend on the status of the first listen before talk function monitoring the first bandwidth part. For example, if the first listen before talk function detects presence of a wireless signal in the first bandwidth part, then the second listen before talk function compares the received signal with the same first energy detect threshold level that was implemented by the first listen before talk function. If the first listen before talk function detects a signal in the monitored channel (such as first bandwidth part) having a signal strength that is lower than a first threshold level, the first LBT function is granted use of the channel; in such an instance, because the first listen before talk function is granted use of first bandwidth part, the second listen before talk function implements an alternative energy detect level, such as a second energy detect threshold level instead of the first energy detection threshold level, to determine the availability of the second bandwidth part (channel). In one embodiment, the second listen before talk function switches over to implementing a higher energy detection level in response to the first listen before talk function acquiring the first bandwidth part. Thus, granted use or current use of a first bandwidth part can cause a change to the energy detect threshold level implemented to monitor the second bandwidth part. The benefit of raising the energy detect threshold level for the second listen before talk function as previously discussed is to make it easier for the wireless base station to acquire simultaneous use of the first by way of and the second bandwidth part to support functions as discussed herein.

In accordance with further example embodiments, acquisition of the rights to the first bandwidth includes: via the first listen before talk function, detecting that a magnitude of the first signal is less than the first threshold level (energy detect level) for the first time duration. Acquisition of the second rights to use the second bandwidth includes: via the second listen before talk function: detecting that a magnitude of the second signal is less than the second threshold level (energy detect level) for the first time duration.

Note further that embodiments herein are useful over conventional techniques of wireless stations competing for use of available wireless bandwidth. For example, the operations performed by the communication management hardware (such as associated with a respective wireless base station) enables increased efficiency and overall use of limited available wireless bandwidth.

Third Embodiments

Further embodiments herein provide improved sharing of wireless bandwidth amongst multiple mobile communication devices via implementation of novel listen before talk functionality.

More specifically, embodiments herein include communication management hardware such as in a wireless station. During operation, the communication management hardware receives notification of a wireless channel scheduled for shared use amongst multiple mobile communication devices. A first mobile communication device (wireless station) implements a first listen before talk function to acquire use of a portion of the shared wireless channel. For example, via implementation of a first listen before talk function, the first mobile communication device acquires use of a first time slot of the wireless channel scheduled for shared use. The connection management resource associated with a second mobile communication device fails to acquire use of the first time slot because it detects use of the first time slot of the wireless channel by the first mobile communication device. The second mobile communication device attempts to acquire use of another time slot of the allocated bandwidth. For example, the second mobile communication device monitors, via a second listen before talk function, for non-use of a second time slot of the wireless channel to acquire use of the second time slot amongst the multiple mobile communication devices. Thus, if the first mobile communication device or other one or more mobile communication devices do not acquire and/or use the second time slot, the second mobile communication device acquires and uses the second time slot.

In accordance with further example embodiments, the second listen before talk function implements a shorter listen before talk interval than the first listen before talk function. Thus, the first mobile communication device acquires the first time slot via the first listen before talk function. In one embodiment, the second listen before talk function is a more lenient (such as implements more lenient parameters such as a shorter listen interval, higher or stronger energy detect threshold level, etc.) listen before talk protocol than the first listen before talk function.

Further embodiments herein include, via the communication management hardware, and subsequent to acquiring the second time slot via the second listen before talk function, utilize the second time slot to wirelessly communicate data over a communication link from a second wireless communication device to a wireless base station.

Yet further embodiments herein include, via the communication management hardware, implementing the second listen before talk function at a second mobile communication device of the multiple mobile communication devices to acquire a second time slot in response to detecting that a magnitude of wireless energy associated with use of the first time slot by the first mobile communication device is above a wireless energy threshold level. In further example embodiments, the communication management hardware of the second mobile communication device implements the first listen before talk function in the first time slot prior to implementing the second listen before talk function in the second time slot. However, the first mobile communication device implements a shorter listen before talk interval time than the second mobile communication device in the first time slot and therefore acquires the first time slot of the shared wireless channel before the second mobile communication device is able to acquire the first time slot.

In still further example embodiments, the wireless channel scheduled for use by the multiple mobile communication devices includes a first set of timeslots interleaved amongst a second set of timeslots. A first set of mobile communication devices is assigned to share use of the first set of timeslots; the second set of timeslots is scheduled for shared use by a second set of mobile communication devices.

Further embodiments herein include, via the communication management hardware, receiving the notification of allocated bandwidth as a wireless communication from a wireless base station that controls use of the shared wireless channel. In one embodiment, the second mobile communication device receives the notification from the wireless base station prior to the second mobile communication device monitoring use of the wireless channel.

In still further embodiments, the first mobile communication device acquires use of the first time slot via implementation of the first listen before talk function. In one embodiment, acquisition of the first time slot results in acquisition of the second time slot as well. However, as previously discussed, if the second mobile communication device detects that the second time slot acquired by the first mobile communication device is not used by the first mobile communication device or other mobile communication device, the second mobile communication device acquires use of the second time slot to communicate with the wireless base station.

In yet further example embodiments, a gap between the first time slot and the second time slot of the shared wireless bandwidth is below a predetermined time threshold value. In such an instance, because the gap is below a predetermined time threshold value, the second mobile communication device can acquire the second time slot via implementation of the second listen before talk function instead of the first listen before talk function.

Still further embodiments herein include, via the communication management hardware implementing the second listen before talk function, detecting that the first time slot is used by a member of the mobile communication devices allocated use of the wireless channel.

Note that any of the resources as discussed herein can include one or more wireless stations, computerized devices, mobile communication devices, sensors, servers, base stations, network nodes, wireless communication equipment, communication management systems, monitors, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable hardware storage medium and/or system having instructions stored thereon. The instructions, when executed by the computer processor hardware, cause the computer processor hardware (such as one or more co-located or disparately processor devices or hardware) to: monitor, via listen before talk operations, both a first bandwidth and a second bandwidth to transmit wireless communications in a network environment; receive access rights to use the first bandwidth prior to receiving access rights to use the second bandwidth, and temporally align use of the first bandwidth and the second bandwidth via communication of a wireless message over the first bandwidth.

Another embodiment herein includes a computer readable hardware storage medium and/or system having instructions stored thereon. The instructions, when executed by the computer processor hardware, cause the computer processor hardware (such as one or more co-located or disparately processor devices or hardware) to: monitor a first bandwidth for access rights via a first listen before talk function specifying a first listen before talk time duration; monitor a second bandwidth for access rights via a second listen before talk function specifying a second listen before talk time duration; and acquire access rights to both the first bandwidth and the second bandwidth in response to detecting that a strength of corresponding monitored wireless signals received in both the first bandwidth and the second bandwidth are below respective energy threshold levels during the first listen before talk time duration.

Another embodiment herein includes a computer readable hardware storage medium and/or system having instructions stored thereon. The instructions, when executed by the computer processor hardware, cause the computer processor hardware (such as one or more co-located or disparately processor devices or hardware) to: receive notification of a wireless channel scheduled for shared use amongst multiple mobile communication devices; detect use of a first time slot of the wireless channel, the first time slot acquired via a first listen before talk function implemented by a first mobile communication device; and monitor, via a second listen before talk function, for non-use of a second time slot of the wireless bandwidth to acquire use of the second time slot amongst the multiple mobile communication devices.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 17 is an example diagram illustrating allocation of wireless channel resources (such as one or more timeslots) of respective bandwidth for use by a set of mobile communication devices according to embodiments herein.

Figure 1:
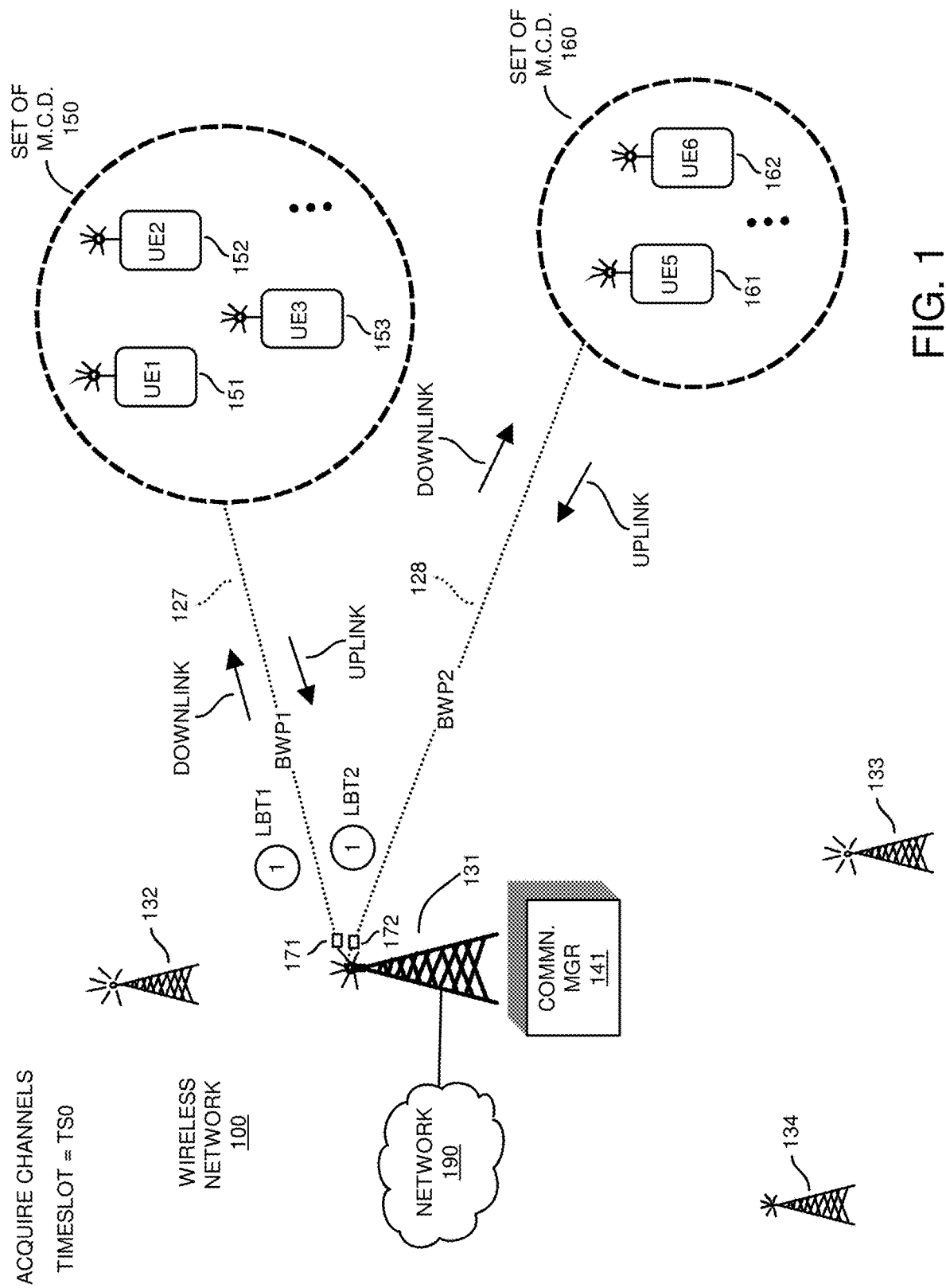
FIG. 1 is an example diagram illustrating monitoring of a network environment for wireless communications via implementation of multiple independent listen before talk functions (LBT1 and LBT2) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Embodiments herein include a wireless base station. The wireless base station monitors, via multiple listen before talk functions, both a first bandwidth and a second bandwidth to transmit wireless communications in a network environment. Based on the monitoring, the wireless base station acquires access rights to use the first bandwidth prior to receiving access rights to use the second bandwidth. Via communication of a wireless message over the first bandwidth, the wireless base station temporally aligns use of the first bandwidth and the second bandwidth to facilitate simultaneous conveyance of communications in a downlink or uplink direction. In one embodiment, the temporal alignment (e.g., alignment in the time domain) and synchronous use of the different wireless channels (in an uplink and/or downlink direction) in the same time slot supports more efficient use of an available wireless spectrum.

Now, with reference to the drawings, FIG. 1 is an example diagram illustrating monitoring of a network environment for wireless communications according to embodiments herein.

As shown in this example embodiment, wireless network environment 100 includes network 190 (such as remote network), wireless base station 131, wireless base station 132, wireless base station 133, wireless base station 134, etc. Wireless base station 131 includes a connection management resource 141 (a.k.a., a communication management resource) to perform processing operations associated with the wireless base station 131.

Network environment 100 further includes multiple sets of mobile communication devices such as mobile communication devices 150, set of mobile communication devices 160, etc.

In this example embodiment, the set of mobile communication devices 150 includes mobile communication device 151 (a.k.a., user equipment #1 or wireless station #1), mobile communication device 152 (a.k.a., user equipment #2 or wireless station #2), mobile communication device 153 (a.k.a., user equipment #3 or wireless station #3), etc. The set of mobile communication devices 160 includes mobile communication device 161 (a.k.a., user equipment #5 or wireless station #5), mobile communication device 162 (a.k.a., user equipment #6 or wireless station #6), etc.

In one nonlimiting example embodiment, each of the mobile communication devices is operated by a respective user. Each mobile communication device includes a respective display screen to display one or more images for viewing by the respective user based on received data over a wireless communication link from the wireless base station 131 (such as a gNodeB). Via one or more wireless communication links 127, the wireless base station 131 provides the mobile communication devices 150 access to remote network 190; via one or more wireless communication links 128, the wireless base station 131 provides the mobile communication devices 160 access to remote network 190; and so on.

Wireless base station 131 includes one or more sets of antenna hardware to communicate with communication devices over respective wireless communication links. For example, the wireless base station 131 uses bandwidth BWP1 (first bandwidth) to communicate over first antenna hardware 171 of wireless base station 131 with the multiple communication devices UE1, UE2, UE3, etc., over wireless communication links 127; wireless base station 131 uses bandwidth BWP2 (second bandwidth) to communicate over second antenna hardware 172 of wireless base station 131 with the multiple communication devices UE5, UE6, etc., over wireless communication links 128; and so on.

Wireless base station 131 and corresponding connection management resource 141 is in communication with the first mobile communication device 151 via a first wireless communication link of the multiple wireless communication links 127; wireless base station 131 and corresponding connection management resource 141 is in communication with the first mobile communication device 151 via a first wireless communication link of multiple wireless links 127; wireless base station 131 and corresponding connection management resource 141 is in communication with the second mobile communication device 152 via a second wireless communication link of the wireless communication links 127; wireless base station 131 and corresponding connection management resource 141 is in communication with the third mobile communication device 153 via a third wireless communication link of the wireless communication links 127; and so on.

Wireless base station 131 and corresponding connection management resource 141 is in communication with the first mobile communication device 161 via a first wireless communication link of wireless communication links 128; wireless base station 131 and corresponding connection management resource 141 is in communication with the second mobile communication device 162 via a second wireless communication link of wireless communication links 128; and so on.

Note that the resources as described herein such as wireless base station 131, connection management resource 141, mobile communication devices, etc., can be implemented via hardware, executed software, or a combination of hardware and executed software.

More specifically, connection management resource 141 (a.k.a., wireless base station 131) can be implemented as communication (connection) manager hardware, executed communication (connection) manager software, or a combination of communication manager hardware and executed communication manager software; wireless base station 131 can be implemented as wireless base station hardware, executed wireless base station software, or a combination of wireless base station hardware and executed wireless base station software; mobile communication device 151 can be implemented as mobile communication device hardware, executed mobile communication device software, or a combination of mobile communication device hardware and executed mobile communication device software; and so on.

As further discussed herein, the wireless base station 131 and corresponding connection management resource 141 support wireless communication with the mobile communication devices via any suitable wireless communication protocol such as one or more of WiFi™, LTE (Long Term Evolution), LAA (Licensed Assisted Access), NR (New Radio), NR-U (New Radio Unlicensed), etc., in the same or different bandwidth. In certain instances, the wireless stations share use of the same wireless bandwidth (such as one or more wireless channels) to convey communications to one or more intended recipient.

In operation #1 of FIG. 1, to support wireless connectivity with the different sets of mobile communication devices 150 and 160, via the connection management resource 140, the wireless base station 131 simultaneously implements a first listen before talk procedure (LBT1) to acquire rights to using bandwidth BWP1 (such as bandwidth part #1) and a second listen before talk procedure (LBT2) to acquire rights to using bandwidth BWP2 (such as bandwidth part #2).

Thus, in one embodiment, the wireless base station 131 and corresponding connection management resource 141 monitors, via the multiple listen before talk operations (such as listen before talk operations LBT1 and listen before talk operations LBT2), both a first bandwidth (such as first bandwidth part, wireless channel, etc.) and a second bandwidth (such as second bandwidth part, wireless channel, etc.) to transmit wireless communications in the network environment 100.

As further discussed herein, based on the monitoring, the wireless base station 131 initially receives access rights to use the first bandwidth BWP1 prior to receiving access rights to use the second bandwidth BWP2.

Via communication of one or more wireless messages over the first bandwidth BWP1, the wireless base station 131 temporally aligns use of the first bandwidth BWP1 and the second bandwidth BWP2. For example, in one embodiment, the wireless base station 131 communicates over the first wireless bandwidth BWP1 to prevent another wireless station in network environment 100 from acquiring and using the first wireless bandwidth BWP1 while the wireless base station 131 continues to perform listen before talk procedure LBT2 to acquire the second wireless bandwidth. Eventually, the wireless base station 131 acquires the second bandwidth BWP2 and efficiently uses both the first bandwidth BWP1 and the second bandwidth BWP2 to support wireless connectivity and communications with sets of mobile communication devices 150, 160, etc., amongst the multiple wireless stations.

Figure 2:
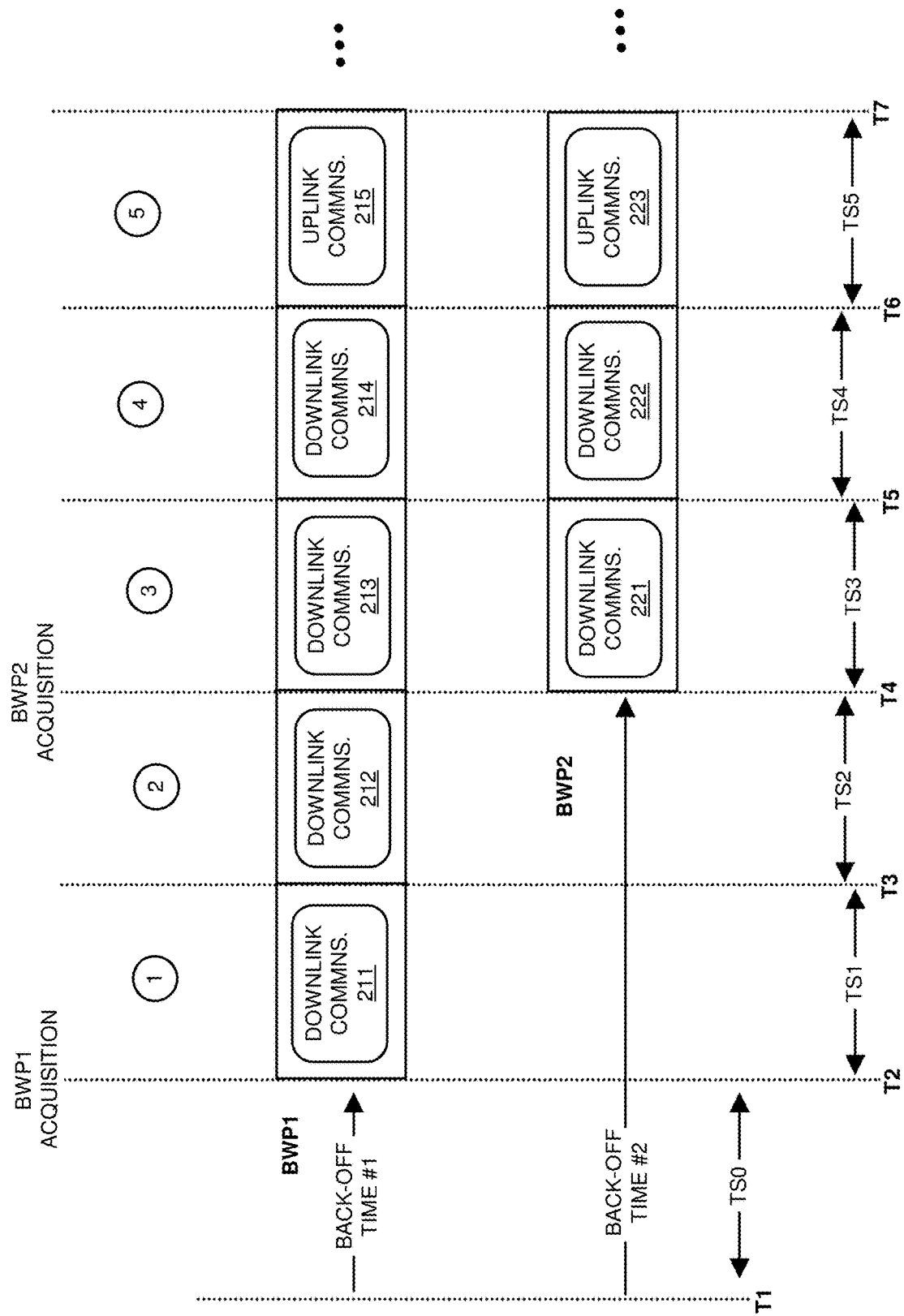
FIG. 2 is an example diagram illustrating implementation of multiple listen before talk back off times, acquisition of multiple channels, and time slot synchronization of using multiple wireless channels according to embodiments herein.

FIG. 2 is an example diagram illustrating implementation of multiple back off times, acquisition of multiple channels, and synchronization of using multiple wireless channels according to embodiments herein.

In this example embodiment, assume that the connection management resource 141 of wireless base station 131 needs to acquire use of multiple wireless channels such as bandwidth BWP1 (such as a first wireless channel) and bandwidth BWP2 (such as a second wireless channel) in order to communicate with both sets of mobile communication devices 150 and 160.

At time T1, the connection management resource 141 implements one or more listen before talk protocols (functions) to acquire rights to use bandwidth BWP1 and bandwidth BWP2.

For example, at or around time T1, via a first listen before talk procedure LBT1, assume that the connection management resource 141 of the wireless base station 131 monitors the bandwidth BWP1 (such as a first wireless channel) and detects a wireless energy level in the first wireless channel BWP1 as being above a threshold value, indicating likely use of the first wireless channel by another one or more wireless stations in the network environment 100.

Further, at or around time T1, via a second listen before talk procedure LBT2, assume that the connection management resource 141 of the wireless base station 131 monitors the bandwidth BWP2 (such as a second wireless channel) and detects a wireless energy level in the second wireless channel as being above a threshold value indicating likely use of the second wireless channel by another one or more wireless stations in the network environment 100.

In such an instance, at or around time T1, the connection management resource 141 of the wireless base station 131 is unable to acquire either bandwidth BWP1 or bandwidth BWP2 to communicate with the mobile communication devices at time T1.

Based on detecting use of desired bandwidth BWP1 and BWP2, the connection management resource 141 of the wireless base station 131 implements a random or fixed back-off time (interval) to before checking use of the respective bandwidth again.

For example, after back-off time #1 with respect to time T1, the connection management resource 141 of wireless base station 131 monitors a level of wireless energy received at first antenna hardware 171 of the wireless base station 131 again. In response to detecting that the energy level of wireless signals received by the antenna hardware 171 is below a threshold value, indicating non-use of the first wireless channel or bandwidth BWP1, the connection management resource 141 acquires use of the first wireless channel (BWP1).

In one embodiment, the back-off time #2 implemented by listen before talk procedure LBT2 is greater than back-off time #1 implemented by listen before talk LBT1.

In time slots TS1 and TS2, the connection management resource 141 of the wireless base station 131 transmits respective communications 211 and 212 from the first antenna 171 of the wireless base station 131 to one or more mobile communication devices in set 150.

As further shown, the connection management resource 141 of the wireless base station 131 implements a random or fixed back-off time (interval) #2 before checking use of the respective bandwidth BWP2 again. For example, after back-off time #2 with respect to time T1 (or other time value), at time T4, the connection management resource 141 of wireless base station 131 implements antenna hardware 172 to monitor a level of wireless energy received at a second antenna of the wireless base station 131.

At time T4, in response to detecting that the wireless energy level at the second antenna hardware 172 in the second bandwidth BWP2 of the wireless base station 131 is below a threshold value, indicating non-use of the second wireless channel BWP2 by other wireless stations in the network environment 100, the connection management resource 141 acquires use of the second wireless channel (BWP2) as well. Thus, at time T4, the connection management resource 141 of the wireless base station 131 has access rights to wireless bandwidth BWP1 and wireless bandwidth BWP2.

After acquiring both bandwidth BWP1 and bandwidth BWP2, the connection management resource 141 of the wireless base station 131 communicates over both bandwidth BWP1 and bandwidth BWP2 to the mobile communication devices such as in time slot TS3.

For example, in time slot TS3, the connection management resource 141 of the wireless base station 131 transmits wireless communications 213 from the first antenna over the bandwidth BWP1 to the first set of mobile devices 150; the connection management resource 141 of the wireless base station 131 transmits communications 221 from the second antenna over bandwidth BWP2 to the second set of mobile devices 160.

In time slot TS4, the connection management resource 141 of the wireless base station 131 transmits wireless communications 214 from the first antenna 171 over the bandwidth BWP1 to the first set of mobile devices 150; the connection management resource 141 of the wireless base station 131 transmits communications 222 from the second antenna hardware 172 over bandwidth BWP2 to the second set of mobile devices 160.

In time slot TS5, the connection management resource 141 of the wireless base station 131 receives wireless communications 215 over antenna hardware 171 and the bandwidth BWP1 from the first set of mobile devices 150; the connection management resource 141 of the wireless base station 131 receives communications 223 over antenna hardware 172 and bandwidth BWP2 from the second set of mobile devices 150.

In this manner, via transmission of wireless communications 211 and communications 212 in timeslots TS1 and TS2 from antenna hardware 171, the wireless base station 131 prevents another wireless station in the network environment 100 from acquiring the bandwidth BWP1 while the wireless base station 131 continues to pursue acquisition of rights to use the second bandwidth BWP2.

Figure 3:
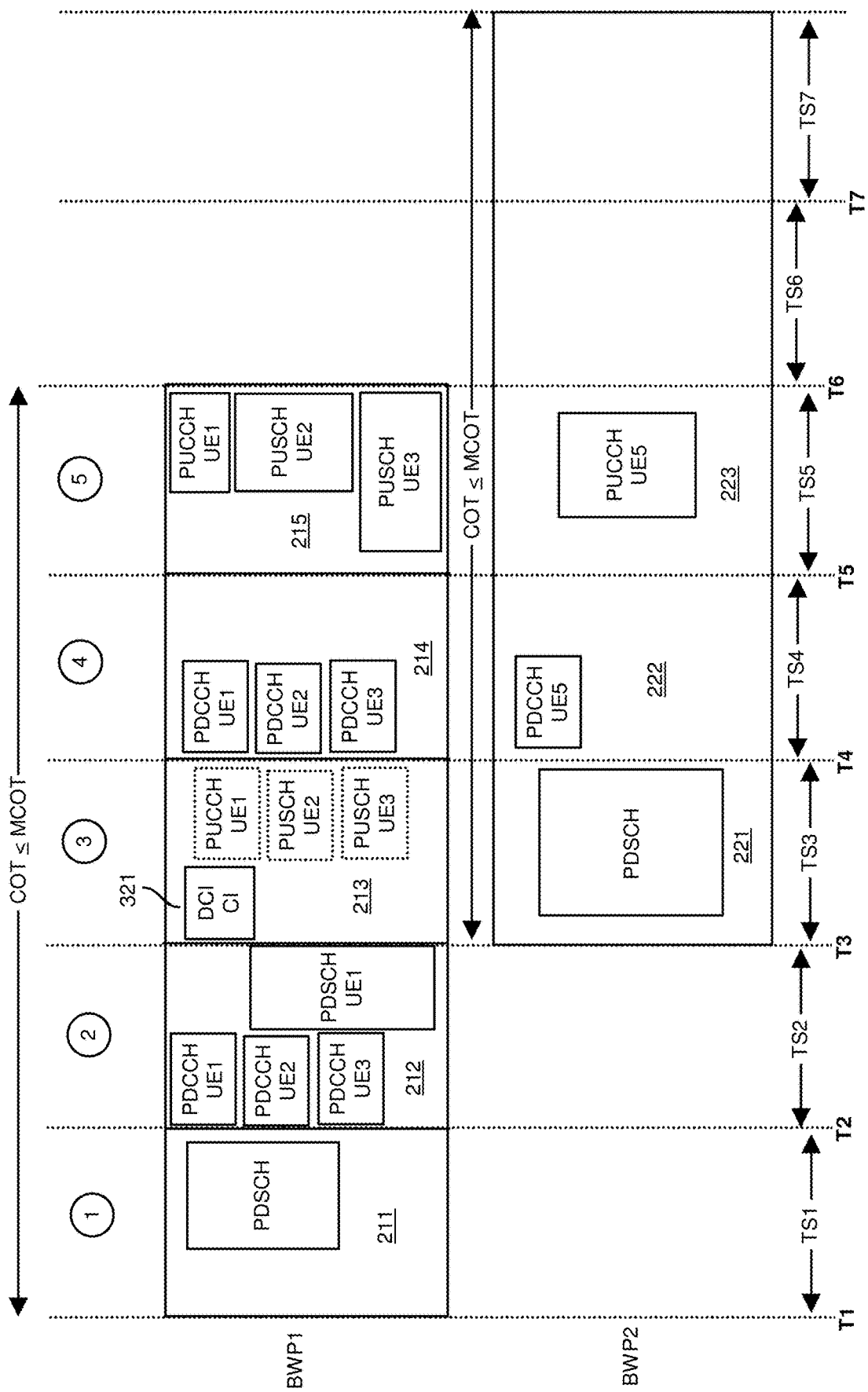
FIG. 3 is an example diagram illustrating conveyance of communications in different timeslots according to embodiments herein.

FIG. 3 is an example diagram illustrating conveyance of communications in different timeslots according to embodiments herein.

In this example embodiment, the wireless base station 131 transmits communications 211, 212, 213, and 214 from antenna hardware 171 to the first set of mobile communication devices 150. The wireless base station 131 transmits communications 221, 222, and 223 from antenna hardware 171 to the first set of mobile communication devices 150.

In time slot TS1, the connection management resource 141 of the wireless base station 131 transmits the downlink communications 211 such as including one or more PDSCH (Physical Downlink Shared Channel) messages from antenna hardware 171.

In time slot TS2, from antenna hardware 171, the connection management resource 141 of the wireless base station 131 transmits downlink communications such as including a first PDCCH message to mobile communication device 151 (UE1); the first PDCCH message schedules communications (PUCCH communications) in the uplink from the mobile communication device 151 (UE1) to the wireless base station 131 in time slot TS3.

In time slot TS2, from antenna hardware 171, the connection management resource 141 of the wireless base station 131 transmits downlink communications such as including a second PDCCH message to mobile communication device 152 (UE2); the second PDCCH message schedules communications (PUSCH communications) in the uplink from the mobile communication device 152 (UE2) to the wireless base station 131 in time slot TS3.

In time slot TS2, from antenna hardware 171, the connection management resource 141 of the wireless base station 131 transmits downlink communications such as including a third PDCCH message to mobile communication device 153 (UE3); the third PDCCH message schedules communications (PUSCH communications) in the uplink from the mobile communication device 153 (UE3) to the wireless base station 131 in time slot TS3.

In time slot TS3, the connection management resource 141 of the wireless base station 131 transmits a cancelation message 321 to the mobile communication devices 151, 152, and 153. The cancelation message 321 (such as DCI CI) cancels: i) the grant of uplink bandwidth PUCCH associated with mobile communication device 151 (UE1) in time slot TS3; ii) the grant of uplink bandwidth PUSCH associated with mobile communication device 152 (UE2) in time slot TS3; iii) the grant of uplink bandwidth PUSCH associated with mobile communication device 153 (UE3) in time slot TS3.

Thus, the cancelation message 321 in communication 213 causes the mobile communication device 151 to cancel its PUCCH communications associated with UE1 in time slot TS3; the cancelation message 321 in communication 213 causes the mobile communication device 152 to cancel its PUSCH communications associated with UE2 in time slot TS3; the cancelation message 321 in communication 213 causes the mobile communication device 153 to cancel its PUSCH communications associated with UE3 in time slot TS3. None of the mobile communication devices 151, 152, and 153 communicate in the uplink direction to the wireless base station 131 in time slot TS3.

Further, in time slot TS3, the connection management resource 141 of the wireless base station 131 communicates a PDSCH message via communications 221 wirelessly transmitted from antenna hardware 172. As previously discussed, management resource of the wireless base station 131 transmits communications 213 in time slot TS3.

In one embodiment, note that the antenna hardware 171 and antenna hardware 172 is a single set of antenna hardware that supports reception and/or transmission of wireless signals. For example, communication over BWP1 and BWP2 likely happen via the same antenna hardware. This applies to all references made to antenna hardware 171 and 172 (such as a single or shared antenna system).

In time slot TS4, during rescheduling, the connection management resource 141 of the wireless base station 131 transmits downlink communications 214 such as including a first PDCCH message from antenna hardware 171 to mobile communication device 151 (UE1); the first PDCCH message schedules communications (PUCCH communications) in the uplink from the mobile communication device 151 (UE1) to the wireless base station 131 in time slot TS5.

In time slot TS4, the connection management resource 141 of the wireless base station 131 transmits downlink communications 214 such as including a second PDCCH message to mobile communication device 152 (UE2); the second PDCCH message schedules communications (PUSCH communications) in the uplink from the mobile communication device 152 (UE2) to the wireless base station 131 in time slot TS5.

In time slot TS4, the connection management resource 141 of the wireless base station 131 transmits downlink communications such as including a third PDCCH message to mobile communication device 153 (UE3); the third PDCCH message schedules communications (PUSCH communications) in the uplink from the mobile communication device 153 (UE3) to the wireless base station 131 in time slot TS5.

In time slot TS5, the connection management resource 141 of the wireless base station 131 receives wireless communications 215 over bandwidth BWP1 at antenna hardware 171 from the mobile communication devices including: i) a corresponding PUCCH message from the mobile communication device 151 (UE1); ii) a corresponding PUSCH message from the mobile communication device 152 (UE2); iii) a corresponding PUSCH message from the mobile communication device 153 (UE3).

In time slot TS5, the connection management resource 141 of the wireless base station 131 receives wireless communications 223 over bandwidth BWP2 at antenna hardware 172 from the mobile communication devices including a corresponding PUCCH message from the mobile communication device 155 (UE5.

Thus, wireless base station 131 and corresponding connection management resource 141 temporally align use of the first bandwidth BWP1 and the second bandwidth BWP2 via communication of wireless communications 212 and 213 over the bandwidth BWP1 such that both the sets of mobile communication devices 150 and 160 communicate in an uplink direction to the wireless base station 131 in the time slot TS5.

In accordance with further example embodiments, the wireless base station 131 such as gNB (gNodeB) is configured and operates multiple BWPs (such as BWP1 and BWP2), and UEs with a single active BWP. The wireless base station 131 or other suitable entity assigns a first BWP1 to support communications with the first set of mobile communication devices 150; the wireless base station 131 or other suitable entity assigns BWP2 to the support communications with the second set of mobile communication devices 152.

When attempting to acquire (access) BWP1 and BWP2, the connection management resource 141 of the wireless base station 131 starts LBT procedures such as via Category-4 (Cat4) listen before talk that has a random waiting (back-off) time. In one embodiment, as previously discussed, the listen before talk LBT1 time of acquiring for BWP1 is achieved earlier than the second listen before talk LBT2. The channel occupancy time for bandwidth BWP1 starts at time T1, otherwise there is a chance other nearby wireless nodes to acquire the bandwidth BWP1.

The channel occupancy time for LBT2 and corresponding use of bandwidth BWP2 starts at time T3.

Note that it is possible that the LBT for BWP2 fails first, but succeeds later (e.g. due to presence of a short WiFi™ frame).

Based on implementing different listen before talk procedures LBT1 and LBT2, the alignment of downlink and uplink resources in BWP1 and BWP2 may be difficult due to an unavoidable random waiting time in accessing multiple BWPs and/or due to independent wireless activities in the two BWPs which are likely across various 20 MHz sub-bands.

This could lead to situations where the wireless base station 131 plans for downlink transmissions (i.e., communications) in a slot while it had already planned for uplink transmissions (by one or more UEs) in another BWP. The uplink transmissions maybe PUCCH (HARQ feedback scheduled a few slots ahead, or other UCI transmissions), sounding RS (SRS), or PUSCH (dynamic or configured grant).

As described herein, to address the issue of acquiring the channels (BWP1 and BWP2) at different times, the wireless base station 131 can be configured to cancel previously scheduled uplink transmissions (i.e., communications) in one or more slots in a given acquired BWP. To do so, the wireless base station 131 informs a set of UEs or all mobile communication devices in a given BWP group (such as set 150, set 160, etc.) to cancel the planned transmission for one or more slots. The wireless base station 131 carries the instruction for uplink (UL) cancellation indication (CI) in an existing/new DCI (Downlink Control Information) command. The behavior of the UE after receiving the UL CI depends on the type of UL transmission it was going to do.

In one embodiment, the UL cancellation indication DCI may be carried in a GC-PDCCH message where each of the mobile communication devices in a set are configured to monitor. The DCI message in communication 213 specifies whether in the current and/or next several slots UL transmission shall be cancelled. In one embodiment, the DCI message is encoded with a new RNTI (Radio Network Temporary Identifier), where UEs may be configured to monitor same before initiating any UL communications from the user equipment to the wireless base station 131.

In accordance with further example embodiments, if a UE, that is scheduled to send HARQ feedback in the current/next slot(s) in its configured active BWP, detects the DCI cancelation message 321, the user equipment cancels transmitting the PUCCH communications in the uplink. In one embodiment, the corresponding UE receiving the cancel message starts a timer and expects that the wireless base station 131 schedules the next HARQ feedback transmission in the current or next COT before expiry of the timer. The UE waits for a HARQ-pull DCI message for the pending HARQ feedback, or drops it and releases the HARQ ID if the timer expires.

In still further example embodiments, if a UE, that is scheduled to send UCI in the current/next slot(s) in its configured active BWP, detects the DCI message, that user equipment cancels transmitting the corresponding PUCCH (uplink) communications. In one embodiment, the UE expects that the wireless base station 131 schedules the cancelled UCI in the current or next COT (Channel Occupancy Time). The UE may update UCI content if necessary.

In yet further example embodiments, if a UE, that is scheduled for PUSCH transmission in the current/next slot(s) in its assigned active BWP, detects the DCI message (cancelation message 321), that user equipment cancels the PUSCH communications. The UE then expects that the wireless base station 131 will reschedule PUSCH communications in the current or next COT.

If a UE, that is scheduled for SRS transmission in the current/next slot(s) in its configured active BWP, detects the DCI message, that user equipment cancels the SRS transmission.

If a UE is about to send a scheduling request (SR) in a configured PUCCH, and has detected DCI (cancel message 321), then that UE cancels the transmission of the SR and starts a timer. The UE does not send a new SR unless the timer has expired (wireless base station 131 may not get to schedule the PUSCH for the UE right after the CI).

Presence of the DCI message (321) in a slot automatically cancels any Configured Grant resources within the slot for that user equipment, and in the subsequent slots if the DCI message indicates so. Hence, if a UE (that prepares for transmission of communications to the wireless base station 131 in an upcoming CG resource) receives the DCI CI (cancel) message, the UE may attempt for an upcoming CG after the canceled period, and the UE may hold its LBT back-off timer value. Alternatively, the UE may re-initiate its backoff timer.

Figure 4:
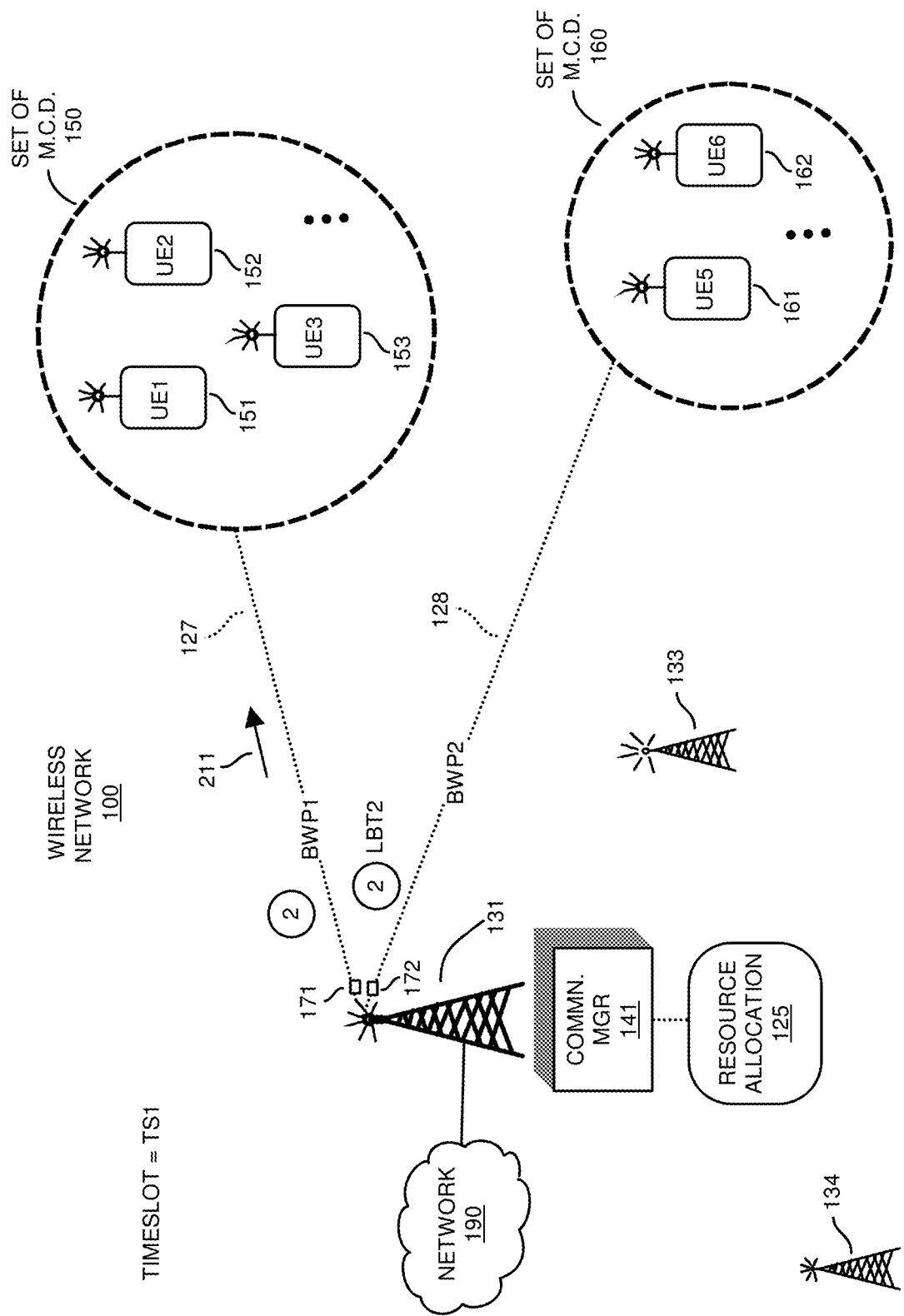
FIG. 4 is an example diagram illustrating transmission of communications over a first wireless channel and continued implementation of listen before talk (LBT2) operations to acquire a second wireless channel according to embodiments herein.

FIG. 4 is an example diagram illustrating transmission of communications over a first wireless channel and implementation of listen before talk operations to acquire a second wireless channel according to embodiments herein.

As previously discussed, at time T1, the connection management resource 141 acquires use of the bandwidth BWP1. In time slot TS1, the connection management resource 141 of the wireless base station 131 transmits wireless downlink communications 211 from antenna hardware 171 of the wireless base station 131 to one or more mobile communication devices in the set of mobile communication devices 150.

The wireless base station 131 has not yet acquired use of the wireless bandwidth BWP2 in time slot TS1 and awaits expiration of back off time #2.

Figure 5:
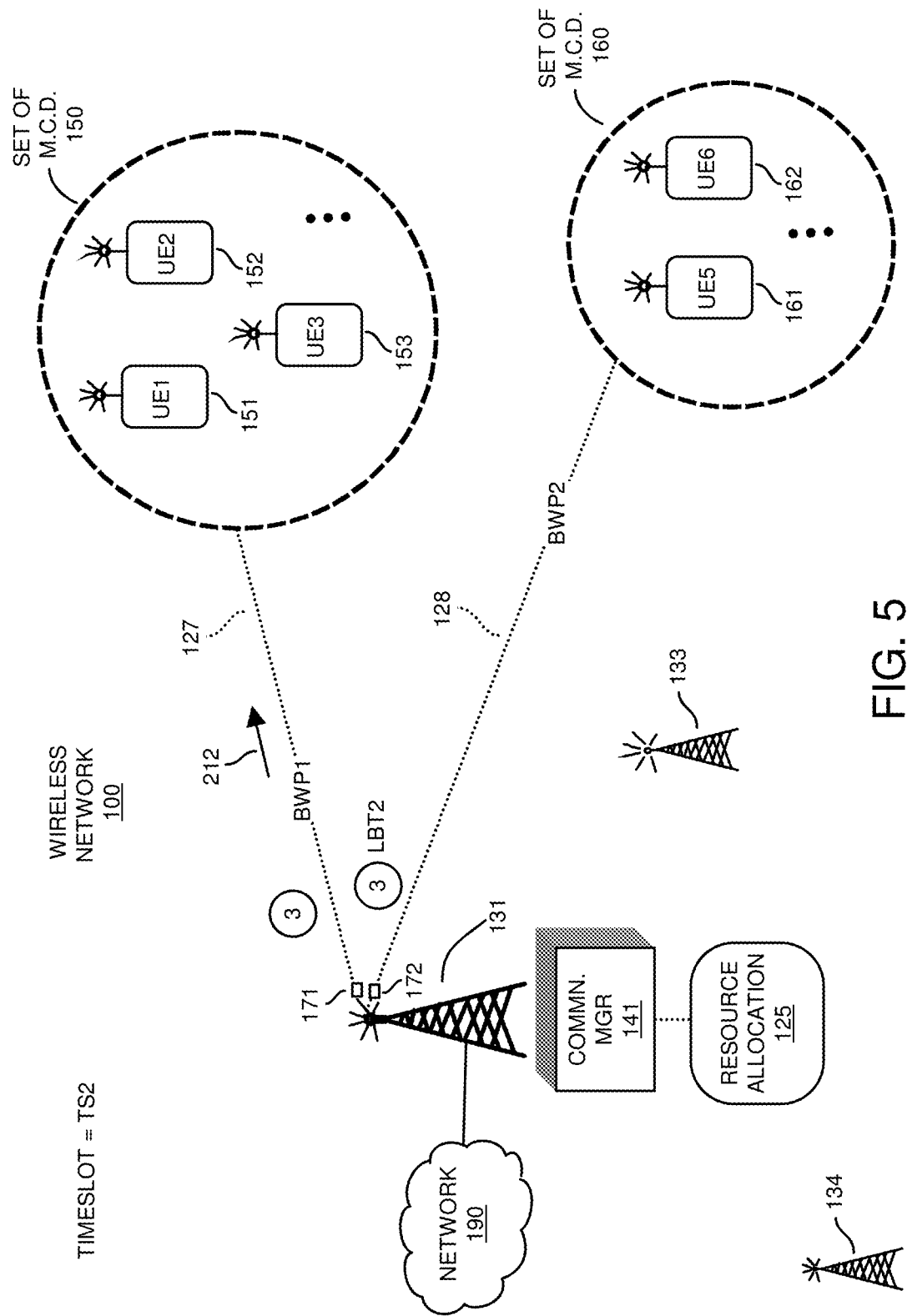
FIG. 5 is an example diagram illustrating transmission of communications over a first wireless channel and implementation of continued listen before talk operations to acquire a second wireless channel according to embodiments herein.

FIG. 5 is an example diagram illustrating transmission of communications over a first wireless channel and implementation of listen before talk operations to acquire a second wireless channel according to embodiments herein.

In time slot TS2, via communications 212, the connection management resource 141 of the wireless base station 131 transmits wireless downlink communications 212 from antenna hardware 171 of the wireless base station 131 to one or more mobile communication devices in the set of mobile communication devices 150.

The wireless base station 131 has not yet acquired use of the wireless bandwidth BWP2 in time slot TS2 and awaits expiration of back off time #2.

Figure 6:
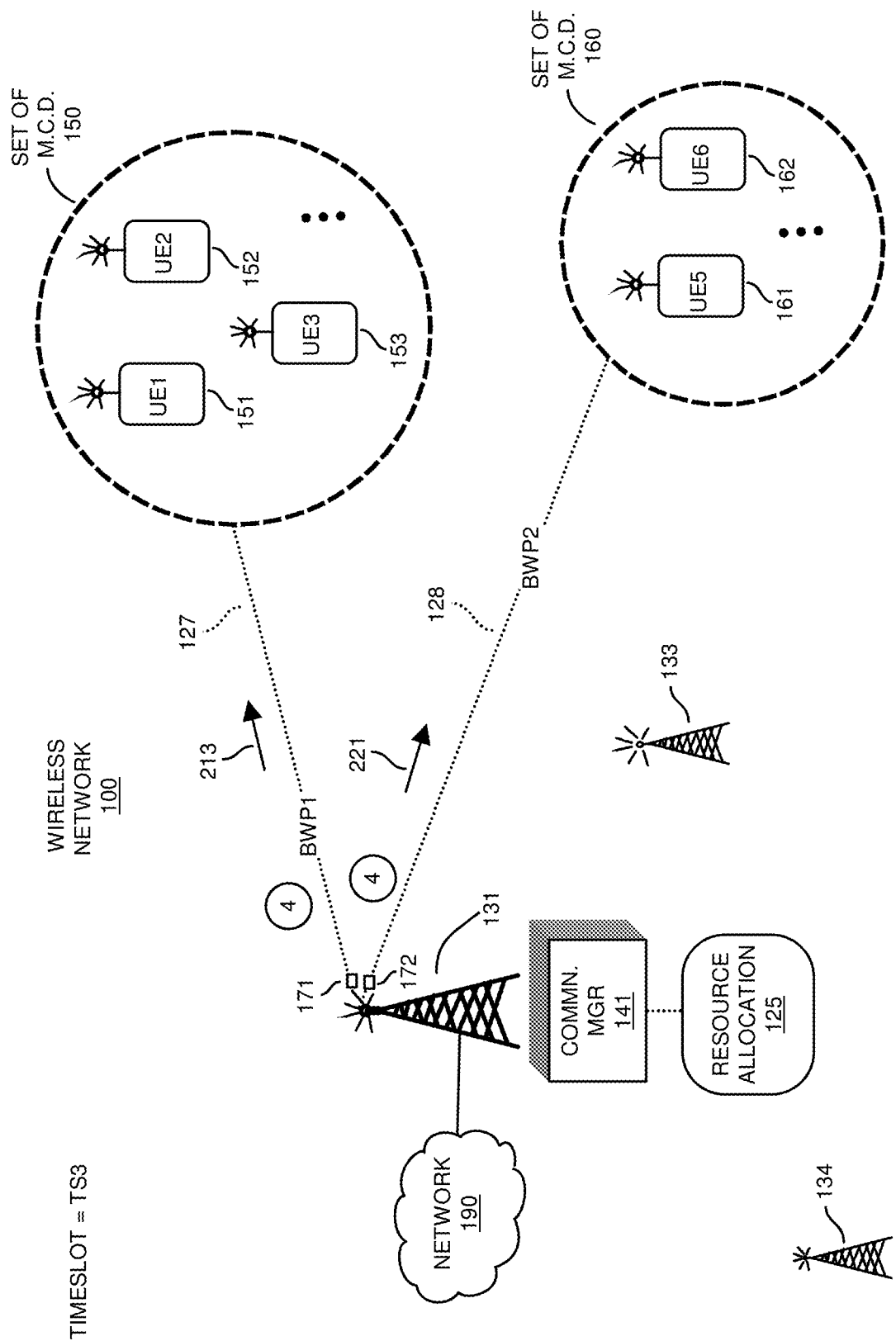
FIG. 6 is an example diagram illustrating transmission of communications over multiple listen before talk acquired wireless channels according to embodiments herein.

FIG. 6 is an example diagram illustrating transmission of communications over multiple acquired wireless channels according to embodiments herein.

As previously discussed, at time T3, via the listen before talk procedure LBT2, the connection management resource 141 acquires use of the bandwidth BWP2. For example, the wireless base station 131 monitors presence of wireless signals in bandwidth BWP2 via antenna hardware 172 and determines that the received wireless signals are below a listen before talk threshold value. In such an instance, the wireless base station 131 acquires the bandwidth BWP2.

In time slot TS3, the connection management resource 141 of the wireless base station 131 transmits wireless downlink communications 213 (such as cancelation message 321 canceling PUCCH associated with UE1, canceling PUSCH associated with UE2, and canceling PUSCH associated with UE3) from the wireless base station 131 over acquired bandwidth BWP1 and antenna hardware 171 to one or more mobile communication devices in the set of mobile communication devices 150.

In time slot TS3, the connection management resource 141 of the wireless base station 131 also transmits wireless downlink communications 221 from the wireless base station 131 over acquired bandwidth BWP2 and antenna hardware 172 to one or more mobile communication devices in the set of mobile communication devices 160.

Figure 7:
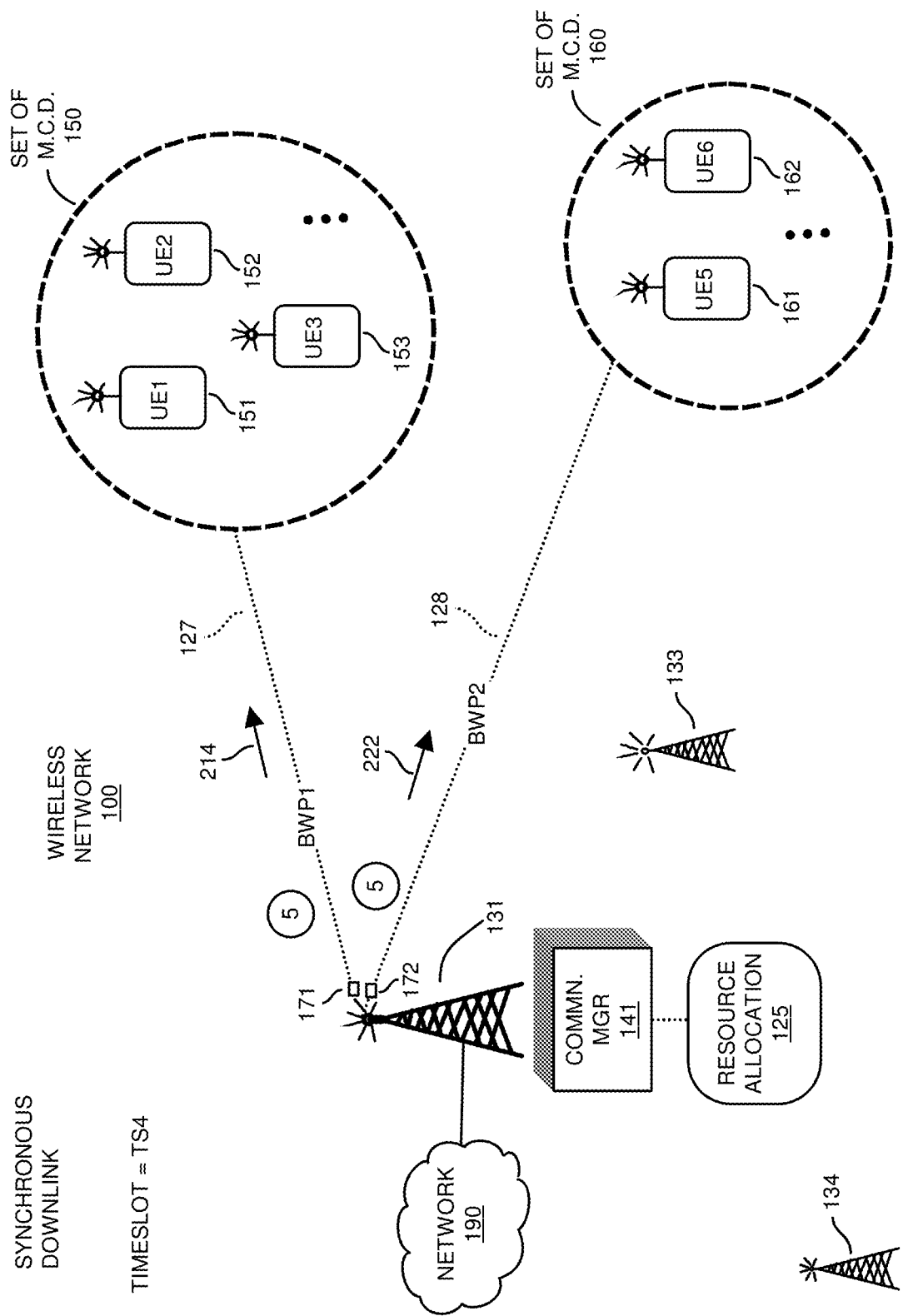
FIG. 7 is an example diagram illustrating synchronized transmission of scheduling communications over multiple acquired wireless channels according to embodiments herein.

FIG. 7 is an example diagram illustrating simultaneous receipt of uplink communications over multiple acquired wireless channels according to embodiments herein.

In time slot TS4, the connection management resource 141 of the wireless base station 131 transmits wireless downlink communications 214 (scheduling uplink communications in time slot TS5 from UE1, UE2, and UE3) from the antenna hardware 171 of the wireless base station 131 over acquired bandwidth BWP1 to one or more mobile communication devices in the set of mobile communication devices 150.

In time slot TS4, the connection management resource 141 of the wireless base station 131 also transmits wireless downlink communications 222 (scheduling uplink communications in time slot TS5 from UE5) from the antenna hardware 172 of the wireless base station 131 over acquired bandwidth BWP2 to one or more mobile communication devices in the set of mobile communication devices 160.

Figure 8:
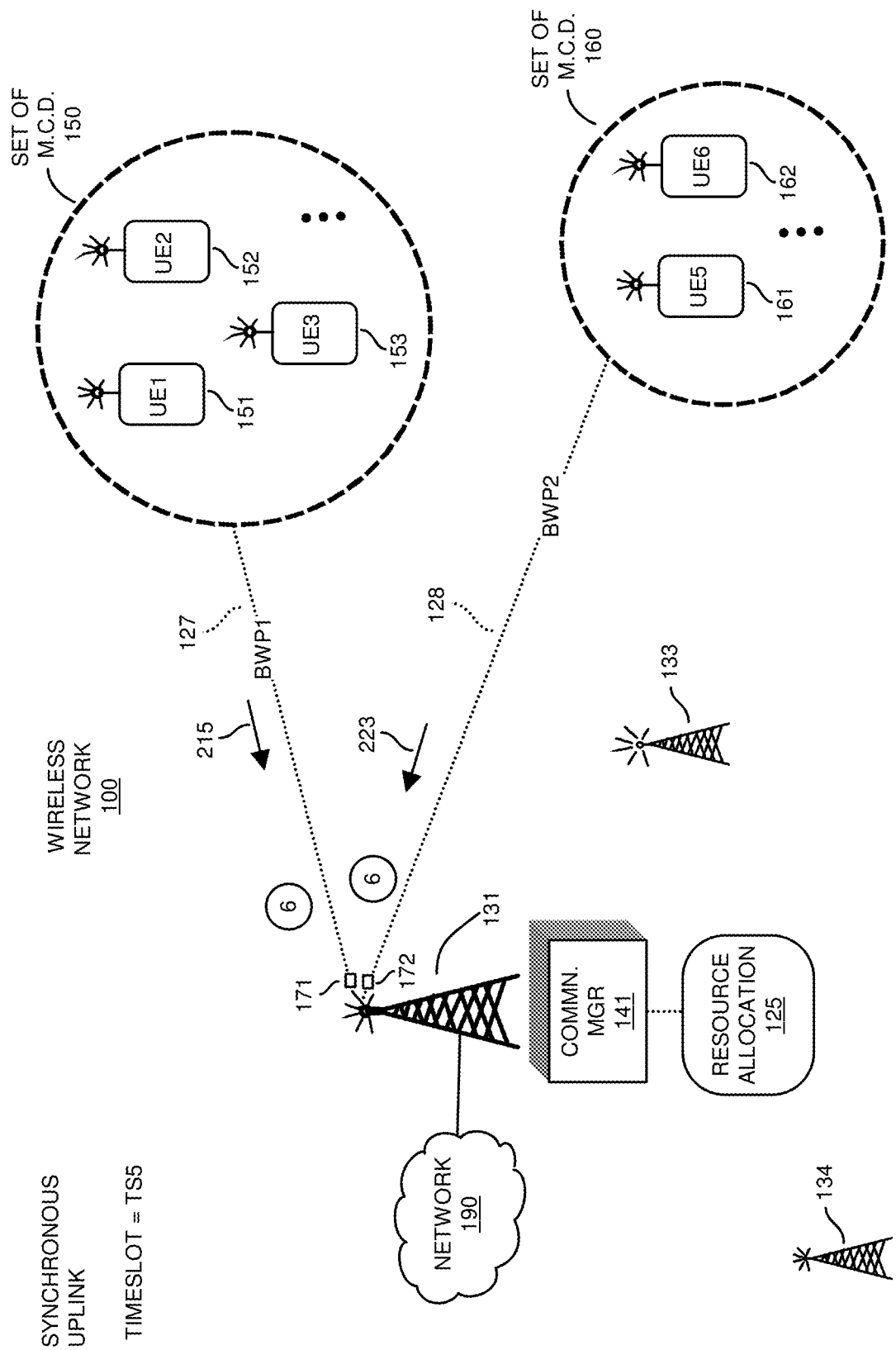
FIG. 8 is an example diagram illustrating simultaneous receipt of uplink communications in a time slot over multiple acquired wireless channels according to embodiments herein.

FIG. 8 is an example diagram illustrating synchronized transmission of scheduling communications over multiple acquired wireless channels according to embodiments herein.

In time slot TS5, the connection management resource 141 of the wireless base station 131 receives scheduled wireless uplink communications 215 at antenna hardware 171 of the wireless base station 131 over acquired bandwidth BWP1 from mobile communication devices UE1, UE2, and UE3 in the set of mobile communication devices 150. Thus, the mobile communication devices UE1, UE2, and UE3 shares use of the time slot TS5.

In time slot TS5, the connection management resource 141 of the wireless base station 131 also receives wireless uplink communications 223 at antenna hardware 172 of the wireless base station 131 over acquired bandwidth BWP2 from mobile communication device UE5.

Figure 9:
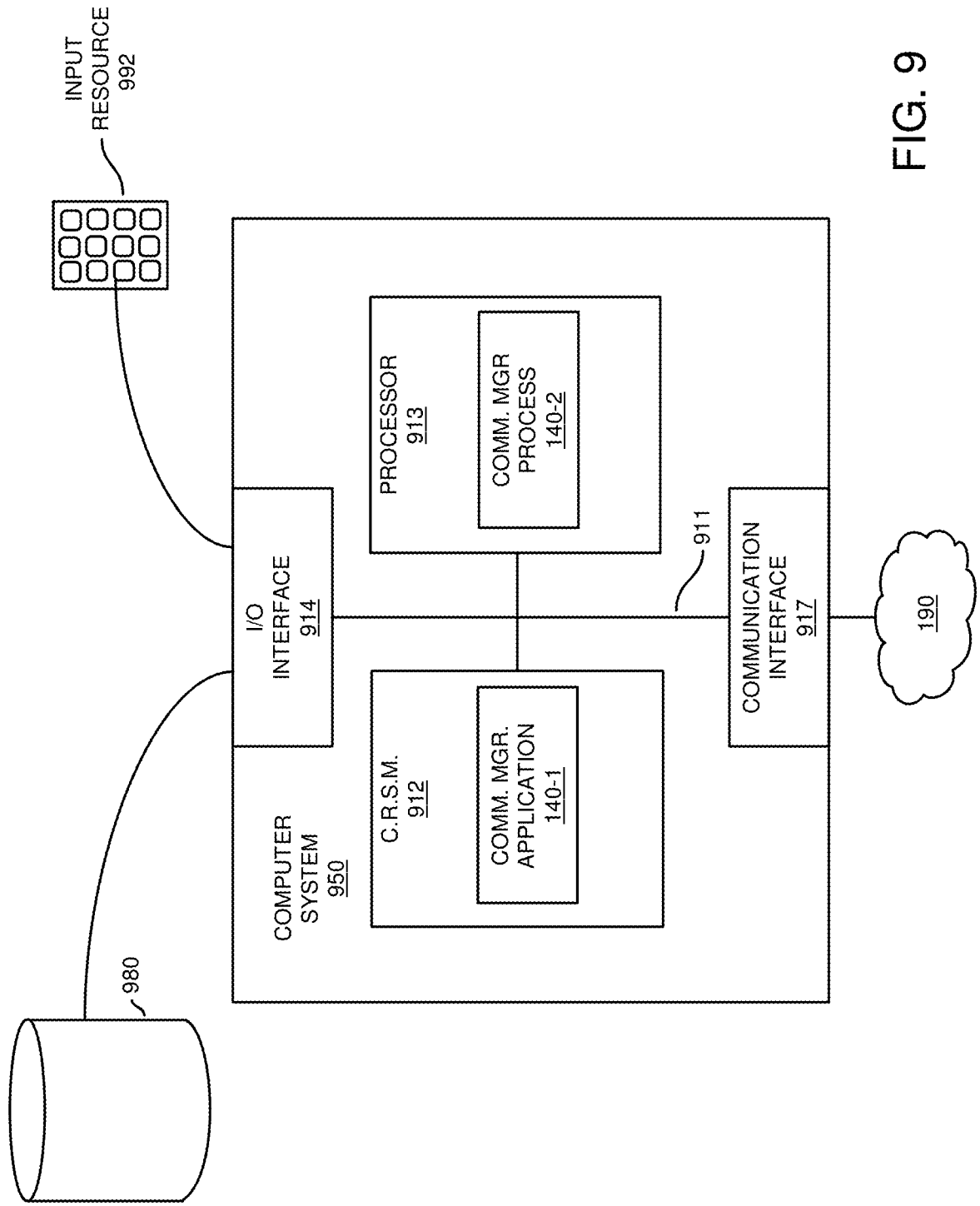
FIG. 9 is an example diagram illustrating example computer hardware and software operable to execute one or more operations according to embodiments herein.

FIG. 9 is an example block diagram of a computer system for implementing any of the operations as previously discussed according to embodiments herein.

Any of the resources (such as communication manager resource 141, wireless base station 131, mobile communication device 151, mobile communication device 152, mobile communication device 161, etc.) as discussed herein can be configured to include computer processor hardware and/or corresponding executable instructions to carry out the different operations as discussed herein.

As shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication manager application 140-1 (e.g., including instructions) in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in communication manager application 140-1 stored on computer readable storage medium 912. Execution of the communication manager application 140-1 produces communication manager process 140-2 to carry out any of the operations and/or processes as discussed herein.

Those skilled in the art will understand that the computer system 950 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via the flowchart in FIG. 10. Note that the steps in the flowcharts below can be executed in any suitable order.

Figure 10:
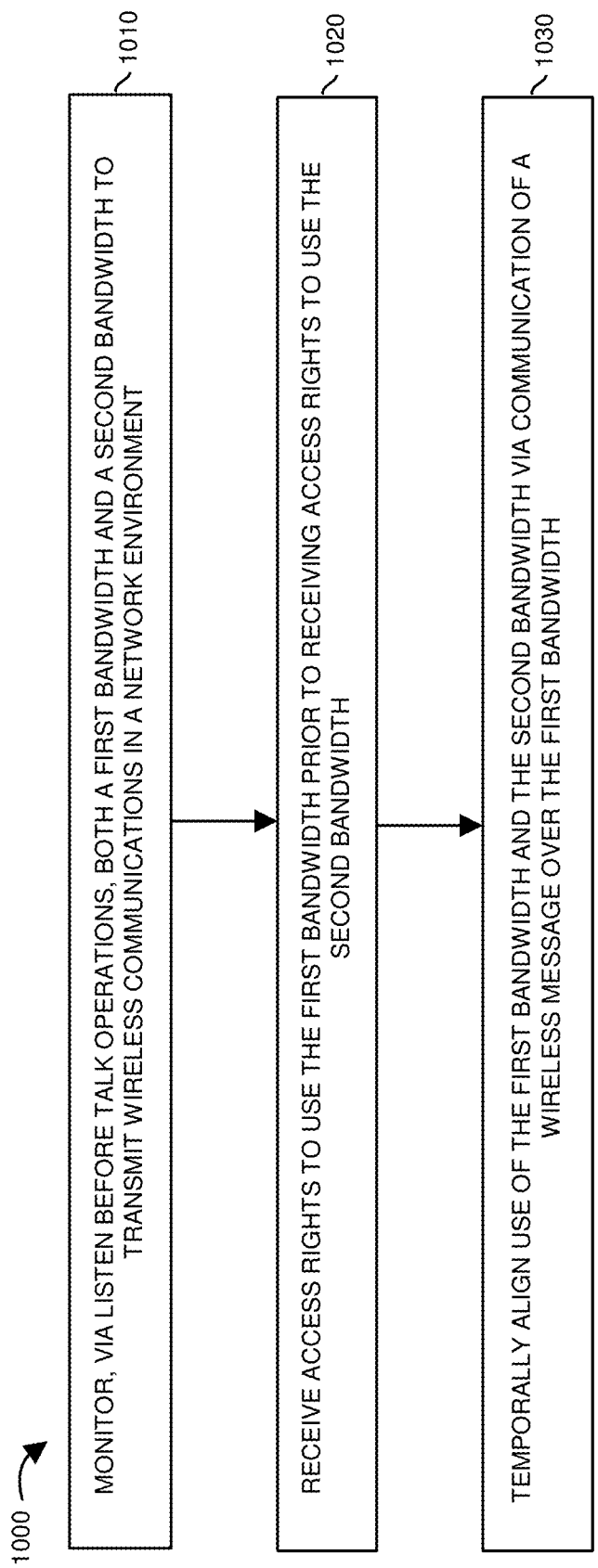
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the wireless base station 131 (via communication management resource 141) monitors, via listen before talk operations LBT1 and LBT2, both a first bandwidth (BWP1) and a second bandwidth (BWP2) to transmit wireless communications in a network environment 100.

In processing operation 1020, the wireless base station 131 (via communication management resource 141) receives access rights to use the first bandwidth (BWP1) prior to receiving access rights to use the second bandwidth (BWP2).

In processing operation 1030, the wireless base station 131 (via communication management resource 141) temporally aligns use of the first bandwidth BWP1 and the second bandwidth BWP2 via communication of wireless communications or messages (such as downlink communications 211, 212, 213, etc.) over the bandwidth BWP1.

Second Embodiments

Embodiments herein include communication management hardware associated with a wireless base station. The communication management hardware monitors a first bandwidth to acquire access rights via a first listen before talk function implementing a first listen before talk time duration. The communication management hardware also monitors a second bandwidth to acquire access rights via a second listen before talk function implementing a second listen before talk time duration. In one embodiment, the communication management hardware acquires access rights to both the first bandwidth and the second bandwidth in response to detecting that wireless signals in both the first bandwidth and the second bandwidth are below respective energy threshold levels during the first listen before talk time duration.

Figure 11:
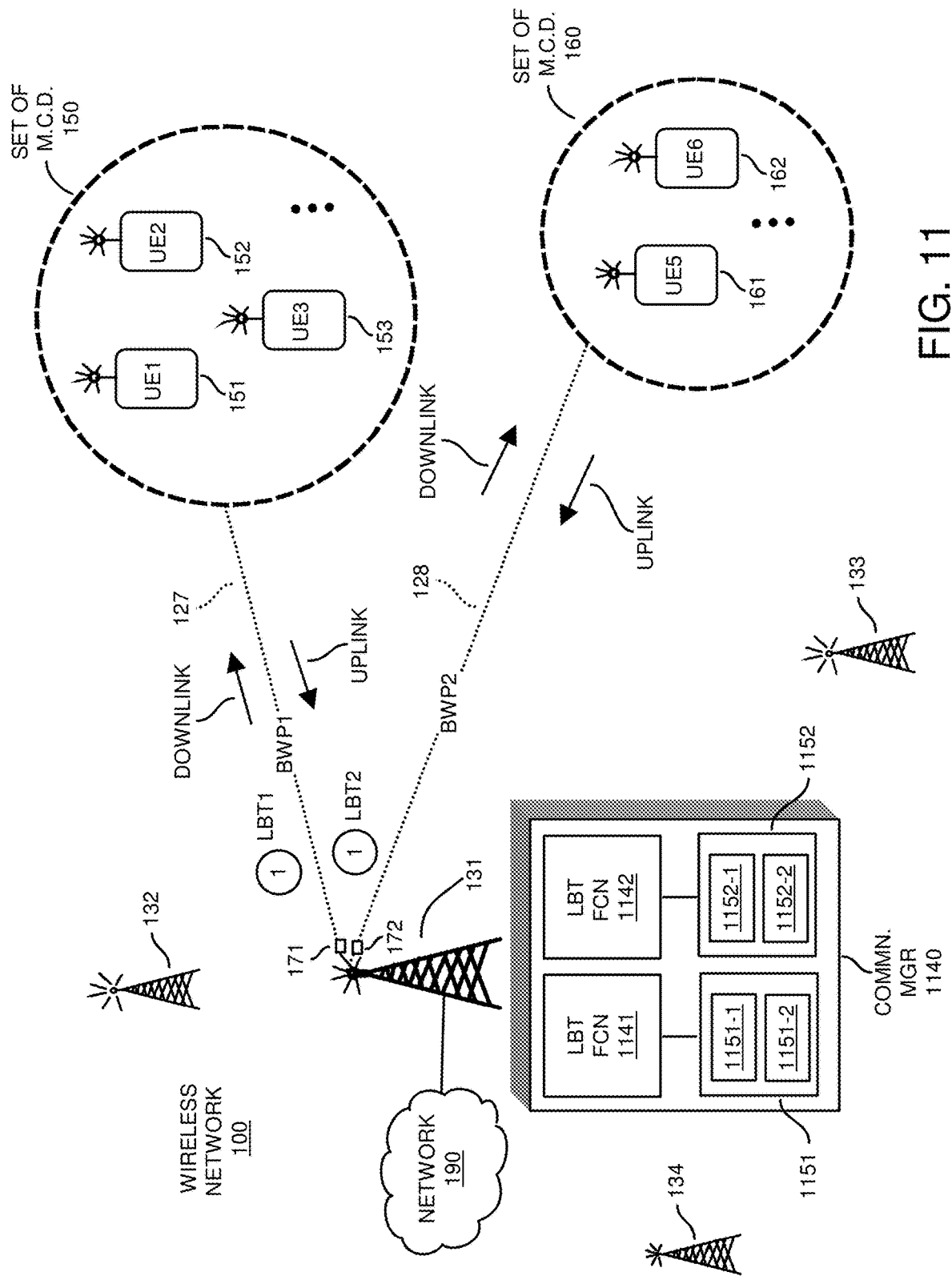
FIG. 11 is an example diagram illustrating monitoring of a network environment for wireless communications via implementation of multiple independent listen before talk functions (LBT1 and LBT2) according to embodiments herein.

Now, with reference to the drawings, FIG. 11 is an example diagram illustrating monitoring of a network environment for wireless communications via implementation of multiple independent listen before talk functions (LBT1 and LBT2) according to embodiments herein. Note that any of the wireless communication devices (such as wireless base station 131, wireless base station 132, . . . , mobile communication device 151, mobile communication device 152, . . . ) in the network environment 100 can be configured to implement the multiple listen before talk functions as described herein.

As shown in this example embodiment, network environment 100 includes network 190 (such as remote network), wireless base station 131, wireless base station 132, wireless base station 133, wireless base station 134, etc. In this example embodiment, the wireless base station 131 includes a communication manager 1140 (a.k.a., a communication management resource such as communication management hardware and or communication management software) to perform processing operations associated with the wireless base station 131.

Network environment 100 further includes multiple sets of mobile communication devices such as mobile communication devices 150, set of mobile communication devices 160, etc.

In this example embodiment, the set of mobile communication devices 150 includes mobile communication device 151 (a.k.a., UE1 or wireless station #1), mobile communication device 152 (a.k.a., UE2 or wireless station #2), mobile communication device 153 (a.k.a., UE3 or wireless station #3), etc.

The set of mobile communication devices 160 includes mobile communication device 161 (a.k.a., UE5 or wireless station #5), mobile communication device 162 (a.k.a., UE6 or wireless station #6), etc.

In one nonlimiting example embodiment, each of the mobile communication devices is operated by a respective user. Each mobile communication device includes a respective display screen to display one or more images for viewing by the respective user based on received data over a respective wireless communication link extending between the mobile communication device and the wireless base station 131 (such as a gNodeB or other suitable entity).

Via the one or more wireless communication links 127, the wireless base station 131 provides each of the mobile communication devices 150 access to remote network 190; via one or more wireless communication links 128, the wireless base station 131 provides the mobile communication devices 160 access to remote network 190; and so on.

Wireless base station 131 includes one or more sets of antenna hardware to communicate with communication devices over respective wireless communication links. For example, the wireless base station 131 uses bandwidth BWP1 (such as first bandwidth, wireless channel, etc.) to communicate (wirelessly receive and transmit) over first antenna hardware 171 of wireless base station 131 with the multiple communication devices UE1, UE2, UE3, etc., over wireless communication links 127; wireless base station 131 uses bandwidth BWP2 (such as second bandwidth, wireless channel, etc.) to communicate (wirelessly receive and transmit) over second antenna hardware 172 of wireless base station 131 with the multiple communication devices UE5, UE6, etc., over wireless communication links 128; and so on.

As further shown, wireless base station 131 and corresponding communication manager 1140 is in communication with the first mobile communication device 151 via a first wireless communication link of the multiple wireless communication links 127; wireless base station 131 and corresponding communication manager 1140 is in communication with the first mobile communication device 151 via a first wireless communication link of multiple wireless links 127; wireless base station 131 and corresponding communication manager 1140 is in communication with the second mobile communication device 152 via a second wireless communication link of the wireless communication links 127; wireless base station 131 and corresponding communication manager 1140 is in communication with the third mobile communication device 153 via a third wireless communication link of the wireless communication links 127; and so on.

Wireless base station 131 and corresponding communication manager 1140 is in communication with the first mobile communication device 161 via a first wireless communication link of wireless communication links 128; wireless base station 131 and corresponding communication manager 1140 is in communication with the second mobile communication device 162 via a second wireless communication link of wireless communication links 128; and so on.

Note that the resources as described herein such as wireless base station 131, communication manager 1140, mobile communication devices, etc., can be implemented via hardware, executed software, or a combination of hardware and executed software.

More specifically, communication manager 1140 (a.k.a., wireless base station 131) can be implemented as communication (connection) manager hardware, executed communication (connection) manager software, or a combination of communication manager hardware and executed communication manager software; wireless base station 131 can be implemented as wireless base station hardware, executed wireless base station software, or a combination of wireless base station hardware and executed wireless base station software; mobile communication device 151 can be implemented as mobile communication device hardware, executed mobile communication device software, or a combination of mobile communication device hardware and executed mobile communication device software; and so on.

The wireless base station 131 and corresponding communication manager 1140 support wireless communications with the mobile communication devices via any suitable wireless communication protocol such as one or more of WiFi™, LTE (Long Term Evolution), LAA (Licensed Assisted Access), NR (New Radio), NR-U (New Radio Unlicensed), etc., in the same or different bandwidth. In certain instances, the wireless stations share use of the same wireless bandwidth (such as one or more wireless channels or bandwidth) to convey wireless communications to one or more intended recipient.

In operation #1 of FIG. 11, to support wireless connectivity with the different sets of mobile communication devices 150 and 160, via the connection management resource 1140, the wireless base station 131 simultaneously implements first listen before talk function 1141 (LBT1) to acquire rights to use bandwidth BWP1 (such as bandwidth part #1) and a second listen before talk function 1142 procedure (LBT2) to acquire rights to use bandwidth BWP2 (such as bandwidth part #2).

Thus, in one embodiment, the wireless base station 131 and corresponding communication manager 1140 monitors, via the multiple listen before talk functions (such as listen before talk function 1141 or LBT1 and second listen before talk function 1142 such as LBT2), both a first bandwidth (such as first bandwidth part, wireless channel, etc.) and a second bandwidth (such as second bandwidth part, wireless channel, etc.) to transmit wireless communications in the network environment 100.

In this example embodiment, during operation, via the listen before talk function 1141, the communication manager 1140 hardware associated with the wireless base station 131 monitors a first bandwidth to acquire corresponding access rights in bandwidth BWP1 using monitor parameters 1151. The first listen before talk function 1141 implements a first listen before talk time duration 1151-1.

Via the second listen before talk function 1142, the communication manager 1140 also monitors a second bandwidth BWP2 to acquire corresponding access rights in bandwidth BWP2 using monitor parameters 1152. The listen before talk function 1142 implements a second listen before talk time duration 1152-1.

In one embodiment, the first listen before talk time duration 1151-1 is less than the second listen before talk time duration 1152-1.

In still further example embodiments, and as further discussed herein, the communication manager 1140 acquires access rights to both the first bandwidth BWP1 and the second bandwidth BWP2 in response to detecting that wireless signals in both the first bandwidth BWP1 and the second bandwidth BWP2 are below respective energy threshold levels (such as energy threshold level 1151-2 and energy threshold level 1152-2) during the first listen before talk time duration associated with the listen before talk function 1141. Additional details of acquiring access rights is shown in the following FIGS. and corresponding text.

Figure 12:
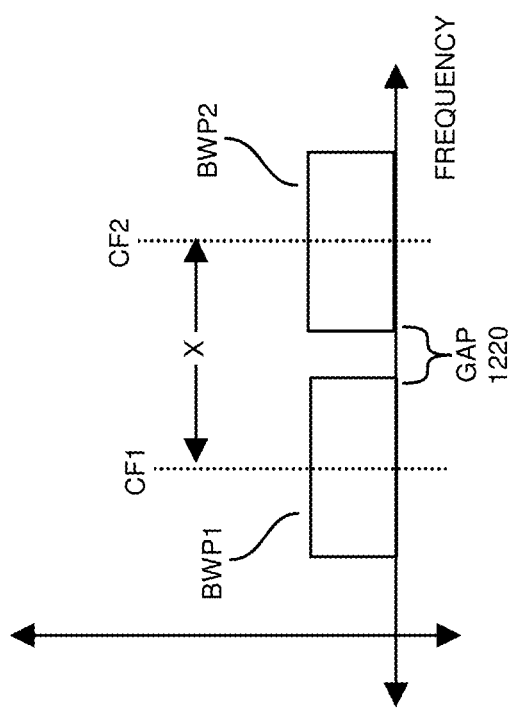
FIG. 12 is an example diagram illustrating spacing of multiple monitored bandwidths according to embodiments herein.

FIG. 12 is an example diagram illustrating spacing of multiple monitored bandwidths according to embodiments herein.

In this example embodiment, assume that the bandwidth BWP1 has a center carrier frequency of CF1 and that the bandwidth BWP2 as a center carrier frequency of CF2. The value X represents a spacing between the carrier frequency CF1 and carrier frequency CF2. Gap 1220 represents a spacing between bandwidth BWP1 and bandwidth BWP2.

Note that the value X varies depending on the embodiment. In one embodiment, the spacing value X between a center carrier frequency CF1 of the first bandwidth BWP1 and a center carrier frequency CF2 of the second bandwidth BWP2 is greater than a predetermined threshold value such as 200 MHz, 300 MHz, 500 MHz, etc., or any other suitable value.

In accordance with further example embodiments, acquiring access rights to both the first bandwidth BWP1 and the second bandwidth BWP2 is dependent, at least in part, upon a bandwidth separation between the first bandwidth and the second bandwidth. For example, the first bandwidth BWP1 may belong to the 5 GHz spectrum; second bandwidth BWP2 may belong to the 6 GHz spectrum. Each of the different listen before talk functions 1141, 1142, etc., implemented one of multiple listen before talk protocols such as Cat2, Cat4, etc.

Figure 13:
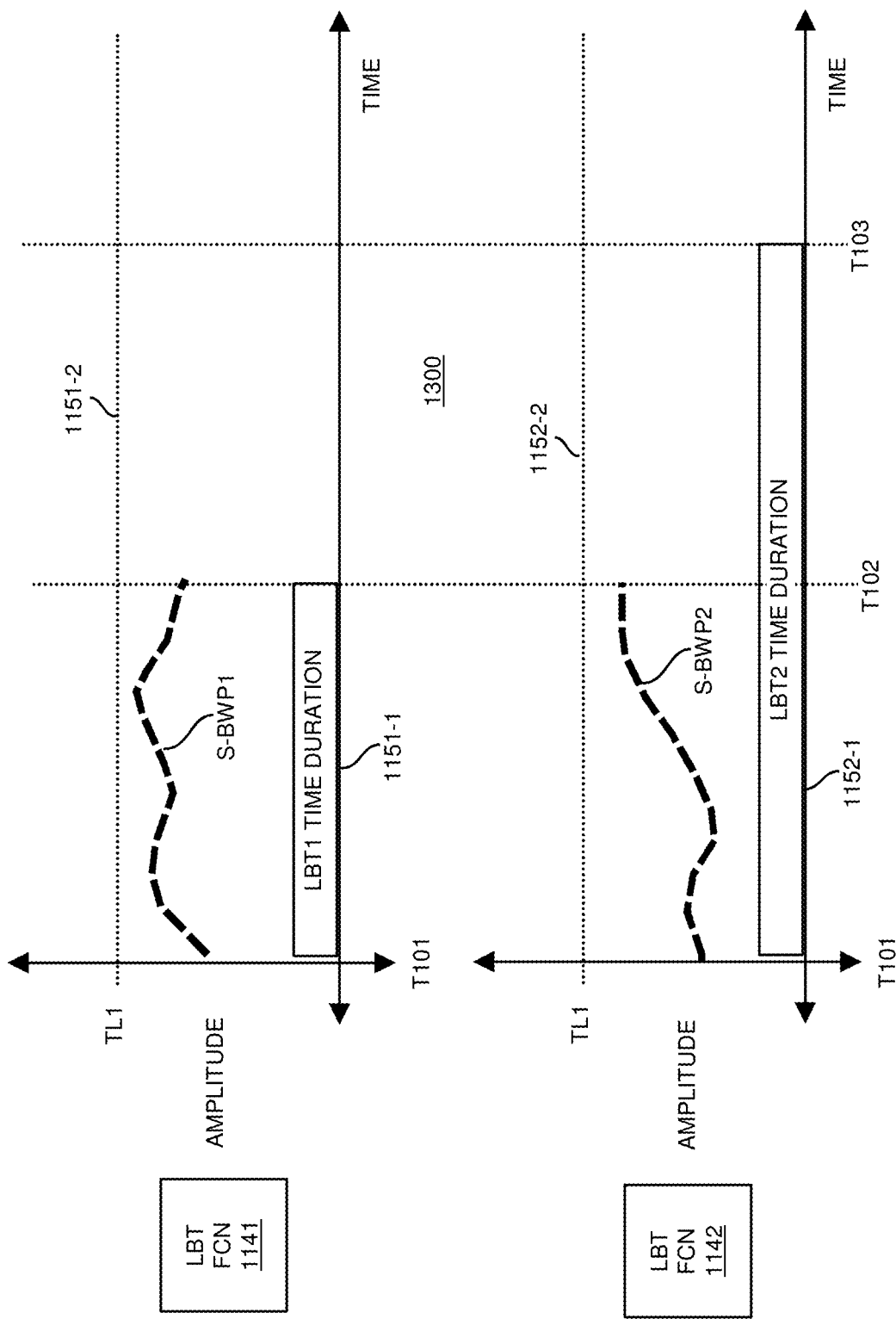
FIG. 13 is an example diagram illustrating monitoring of energy associated with multiple bandwidths and comparison of same to respective threshold levels according to embodiments herein.

FIG. 13 is an example diagram illustrating monitoring of energy associated with multiple bandwidths and comparison to respective threshold levels according to embodiments herein.

In still further example embodiments, acquisition of the bandwidth rights by the communication manager 1140 associated with the wireless base station 131 includes: via the first listen before talk function 1141, monitoring the network environment 100 for wireless signals in the first bandwidth BWP1 starting at time T101. In one embodiment, based on wireless energy detected by the first antenna hardware 171, the listen before talk function 1141 produces signal S-BWP1 indicative of a first wireless power (energy) level of receiving communications in the first monitored bandwidth BWP1. The listen before talk function 1141 compares the signal S-BWP1 over time duration 1151-1 to the first threshold level 1151-2 (a.k.a., TL1).

Additionally, based on wireless energy detected by the second antenna hardware 172 (which may be the same as antenna hardware 171), the listen before talk function 1142 produces signal S-BWP2 indicative of a second wireless power (energy) level of receiving wireless communications in the second bandwidth BWP2 starting at time T101 or other random time before or after time T101. The listen before talk function 1142 compares the signal S-BWP2 over time duration 1152-1 to the second threshold level 1152-2 (such as threshold level TL1).

In accordance with further example embodiments, acquisition of the rights to use the first bandwidth BWP1 and bandwidth BWP2 includes: i) via the first listen before talk function 1141, detecting that a magnitude of the first signal S-BWP1 is less than the threshold level TL1 (energy detect level 1151-2) for the entire LBT1 time duration 1151-2 (such as time between T101 and T102); and ii) via the second listen before talk function 1142, detecting that a magnitude of the second signal S-BWP2 is less than the threshold level TL1 (energy detect level 1152-2) for the entire LBT1 time duration 1151-1 (instead of time duration 1152-1).

Thus, in this example embodiment, the wireless base station 131 acquires use of the bandwidth BWP1 and bandwidth BWP2 at or around time T102 (associated with the shorter time duration 1151-1) instead of at time T103 corresponding to the longer time duration 1152-1.

Note that the magnitude of the energy threshold levels can be set to any suitable value depending on the embodiment. By way of non-limiting example embodiment, in one embodiment, the energy threshold level 1151-2 is equal to −72 dBm; the energy threshold level 1152-2 is equal to −72 dBm.

Thus, the respective threshold levels implemented by the first listen before talk function 1141 and the second listen before talk function 1142 include a first wireless energy threshold level 1151-2 (TL1) and a second wireless energy threshold level 1152-2 (TL1). In this example embodiment, the magnitude of the energy threshold levels 1151-2 and 1152-2 are the same. As discussed below, the energy threshold levels applied by each of the listen before talk functions can vary.

Referring again to FIG. 11 (or FIG. 1), in one embodiment, acquisition of the rights to use both the first bandwidth BWP1 and the second bandwidth BWP2 results in communicating a message indicating acquisition of the first bandwidth from the first listen before talk function 1141 (component carrier monitor) that monitors the first bandwidth BWP1 to a second listen before talk function 1142 (component carrier monitor) that monitors the second bandwidth BWP2. Such notification (such as acquisition of a wireless channel) can be configured to trigger the second listen before talk function 1142 to change the remaining amount of time that the listen before talk function 1142 is to monitor the wireless signal S-BWP2 to be below a threshold level 1152-2 in order to acquire the wireless channel BWP2. The remaining amount of listen before talk end time can be changed to a final time duration end value of anywhere between time T102 and time T103. As further discussed below, embodiments herein include monitoring the respective energy detect threshold level of the second listen before talk function 1142 in response to detecting a condition in which the first listen before talk function 1141 acquires the wireless channel BWP1.

Figure 14:
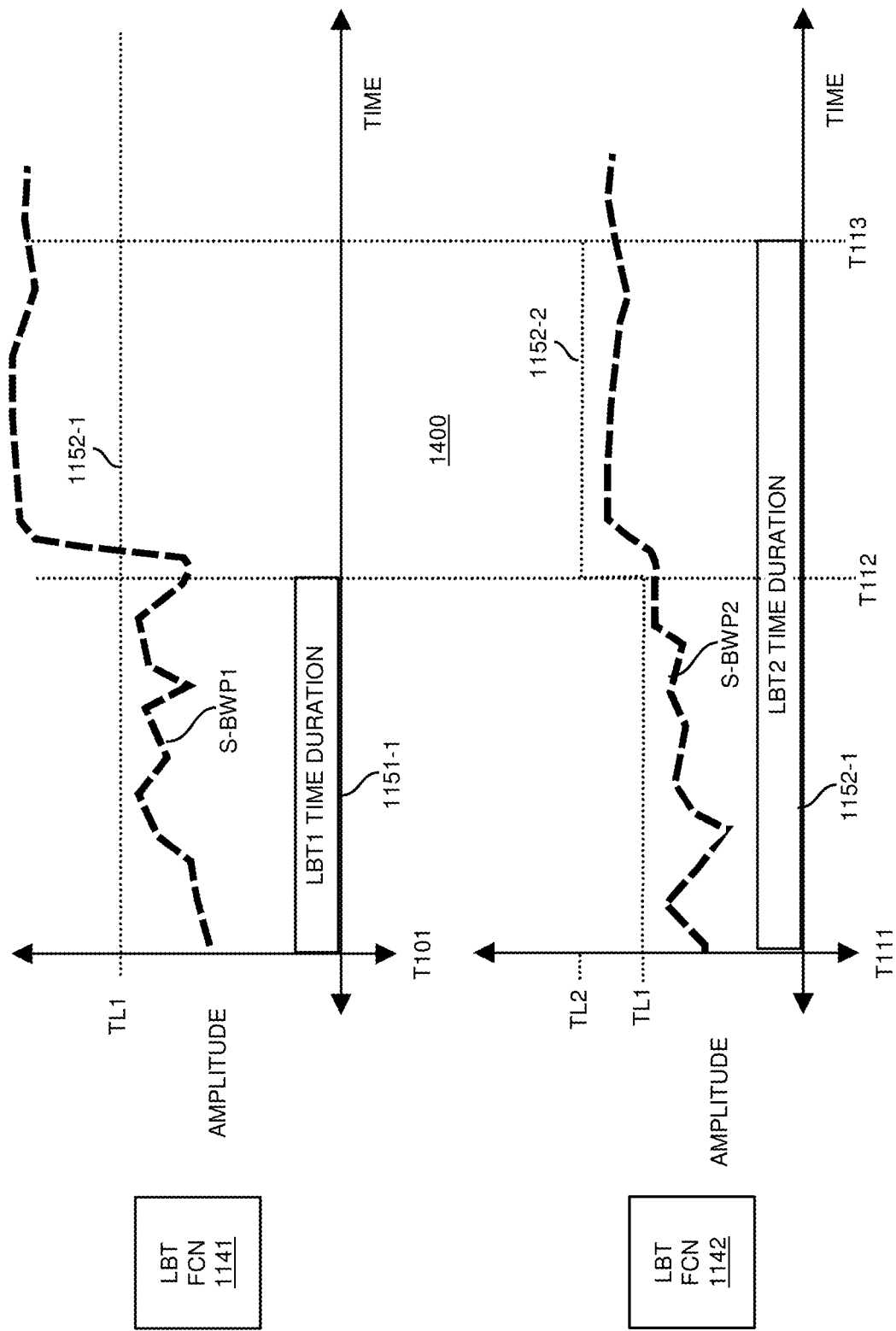
FIG. 14 is an example diagram illustrating monitoring of energy associated with multiple bandwidths and comparison of same to respective threshold levels according to embodiments herein.

FIG. 14 is an example diagram illustrating monitoring of energy associated with multiple bandwidths and comparison to respective threshold levels according to embodiments herein.

In one embodiment, note that the energy detection threshold levels implemented by each of the listen before talk function 1141 and 1142 may initially be the same threshold level setting such as threshold level TL1. However, depending on the outcome of the listen before talk function 1141 associated with bandwidth part BWP1, such as a successful access to the BWP1 channel, the second listen before talk function 1142 implements a different energy detect threshold level TL2 (such as less sensitive setting). Thus, the listen before talk function 1141 and listen before talk function 1142 may initially be the same threshold level TL1, but eventually implement different threshold levels as discussed below.

As an example, the level/threshold that the second listen before talk function 1142 uses to monitor usage of a second bandwidth part BWP2 depends on the status of the first listen before talk function 1141 monitoring the first bandwidth part BWP1.

More specifically, if the first listen before talk function 1141 detects presence of a signal S-BWP1 in the first bandwidth part above the threshold level TL1, then the second listen before talk function 1142 compares the received signal S-BWP2 with the same first energy detect threshold level TL1 that was implemented by the first listen before talk function 1141. However, if the first listen before talk function 1141 detects a signal S-BWP1 in the monitored channel (such as first bandwidth part) that is lower than the first threshold level TL1 (a.k.a., level 1152-1) for the time duration 1151-1, the first LBT function 1141 is granted use of the channel BWP1; in such an instance, in one embodiment, because the first listen before talk function 1141 acquires use of the first bandwidth part BWP1 such as at or around time T112 and thereafter, the second listen before talk function 1142 switches to implementing an alternative energy detect level, such as a second energy detect threshold level TL2 (a higher energy detect threshold level) instead of the first energy detection threshold level TL1, to determine the availability of the second bandwidth part BWP2 (channel).

In other words, at or around time T112, assume that the listen before talk function 1141 obtains the channel BWP1. The granted use or current use of a first bandwidth part BWP1 to the wireless station 131 causes a change to the energy detect threshold level implemented by the second listen before talk function 1142 at or around time T112 to monitor the second bandwidth part BWP2.

For example, in response to detecting that the first listen before talk function 1141 obtains rights to use channel BWP1, the listen before talk function 1142 increases the energy detect threshold level from threshold level TL1 (such as −82 dBm or other suitable value) to a higher threshold level TL2 (such as −72 dBm or other suitable value). If the signal S-BWP2 as monitored by the listen before talk function 1142 remains below the raised threshold level TL2 for the final duration (such as between T112 and T113) of the listen before talk duration LBT2 (1152-1), the listen before talk function 1142 acquires the channel BWP2 for use as well. Conversely, if the signal S-BWP2 is greater than the threshold level TL2 any time between time T112 and time T113, the listen before talk function 1142 does not acquire the use of the channel BWP2.

In still further example embodiments, note that embodiments herein include implementing a combination of energy detect threshold level adjustment and listen before talk time duration adjustment. For example, in response to detecting that the first listen before talk function 1141 acquires the wireless channel BWP1 such as at or around time T112, the final end time of the listen before talk time duration 1152-1 can be shortened to any time value between T112 and T113. As previously discussed, the energy detect threshold level can be raised to a higher energy detect threshold level. If the second listen before talk function 1142 detects that the signal S-BWP2 remains below the variable threshold level and duration a full duration of the variable listen before talk time duration, the second listen before talk function 1142 acquires use of the wireless channel BWP2.

Additionally, as previously discussed, note again that the first listen before talk function 1141 and the second listen before talk function 1142 do not always start monitoring signal levels for channel acquisition at the same time.

Note that the magnitudes of the energy threshold levels can be any suitable values. For example, in one embodiment, the energy threshold level 1152-1 is equal to −82 dBm; the energy threshold level 1152-2 is initially equal to a value such as −82 dBm, but is later changed to another threshold level such as −72 dBm, in response to detecting acquisition of the wireless channel BWP1 by the wireless station 131.

In a similar manner as previously discussed, acquisition of the bandwidth usage rights by the communication manager 1140 includes: via the first listen before talk function 1141, monitoring the network environment 100 for wireless signals in the first bandwidth BWP1. In one embodiment, based on wireless energy detected by the first antenna hardware 171 monitoring the bandwidth BWP1, the listen before talk function 1141 produces signal S-BWP1 indicative of a first wireless energy level of receiving communications in the first bandwidth BWP1. The listen before talk function 1141 compares the signal S-BWP1 to the first threshold level 1152-1 (TL1) to determine availability of the bandwidth BWP1.

Based on wireless energy detected by the second antenna hardware 172, the listen before talk function 1142 produces signal S-BWP2 indicative of a second wireless energy level of receiving communications in the second bandwidth BWP2. The listen before talk function 1142 compares the signal S-BWP2 to the second threshold level 1152-2 (such as initially TL1).

In accordance with further example embodiments, acquisition of the rights to use the first bandwidth BWP1 and bandwidth BWP2 includes: i) via the first listen before talk function 1141, detecting that a magnitude of the first signal S-BWP1 is less than the threshold level TL1 (energy detect level 1152-1) for the entire LBT1 time duration 1151-1 (such as between time T111 and time T112); and ii) via the second listen before talk function 1142, detecting that a magnitude of the second signal S-BWP2 is less than the threshold level TL2 (energy detect level 1152-2, where TL1>TL2) for the entire LBT1 time duration 1151-1 (such as time between T111 and T112) instead of full time duration 1152-2 (such as between time T111 and time T113).

As previously discussed, the embodiments as described herein can be implemented in any suitable environment. Note that in the 5 GHz and 6 GHz unlicensed spectrum, channel access is specified per 20 MHz channels. In this unlicensed spectrum, each bandwidth (BWP) may be defined as a contiguous portion of the spectrum (such as gap 1220 in FIG. 12 being equal to zero or near zero) with bandwidth of 20 MHz (or multiple of 20 MHz). Hence, when accessing multiple bandwidths (such as BWP1 and BWP2), which are potentially non-contiguous BWPs (i.e., spaced apart from each other as shown in FIG. 12, such as X>a predetermined threshold value such as 300 MHz or other suitable value), the communication manager 1140 implements listen before talk functions 1141 and 1142.

Some listen before talk regulators specify the type of LBT category to be used when a respective communication device (such as wireless base station 131) accesses multiple channels at the same time. For instance, policies require channel access of each 20 MHz via LBT Cat4 (random listen interval time), unless the channel has a frequency separation X (some predetermined amount) or gap 1220 less than a threshold with a primary channel that LBT Cat4 is invoked for, in which case, LBT Cat2 is invoked. In one embodiment, as previously discussed, if a wireless base station 131 (such as gNB) attempts to simultaneously access multiple BWPs with an LBT type Cat4 (each has a different random listen interval), there is a chance that LBT function (procedure) may be successful only on a subset of the BWPs being acquired. As previously discussed, to enhance channel access across all of the BWPs, a wireless base station 131 (such as gNB) may use LBT Cat4 when monitoring BWP1 (such as via listen before talk function 1141) and a different LBT category (such as via listen before talk function 1142) when monitoring another BWP2.

In further example embodiments, the listen before talk function 1141 of the wireless base station 131 implements LBT Cat4 (random back off time or listen interval such as between 10 to 40 microseconds) on each of the listen before talk monitoring functions 1141 and 1142. As soon as the associated back-off timer for the LBT of one BWP expires (indicating a successful LBT Cat4 access), in a manner as previously discussed, the wireless base station 131 acquires all the monitored BWPs simultaneously, pending no signal stronger than the EDT (threshold level TL1 or TL2) is detected in each of the monitored bandwidth parts. This is equivalent that the LBT category for the remaining BWPs (while not Cat4) has a back-off time longer than the back-off time of LBT Cat2 (fixed listen interval time of 25 microseconds).

Carrier Aggregation

Note that embodiments herein can be extended to channel access in carrier aggregation (CA) use cases. For example, in LTE (Long Term Evolution) networks and NR (New Radio) networks, carrier aggregation refers to aggregation of multiple component carriers (CC) where an eNB/gNB (a.k.a., wireless station) transmits or receives wireless signals across the component carriers. Similarly, a UE that is configured to operate in multiple component carriers, transmits or receives wireless signals across the two or more component carriers.

Note that in carrier aggregation, a respective MAC processing layer and PHY processing layer of each component carrier is independent of MAC/PHY of another component carrier (while there is synchronization among PHY of multiple CCs).

Note further that carrier aggregation is also possible across multiple component carriers, where all of the component carriers belong to a same unlicensed band, e.g. 5 GHz, or the multiple component carriers may belong to two or more unlicensed bands in which a first component carrier CC1 may be implemented via 5 GHz bandwidth while a second component carrier CC2 may be implemented via 6 GHz bandwidth.

For sake of better coexistence with other RATs (Radio Access Technologies) using the same unlicensed band, the different carrier components in 5 GHz and 6 GHz unlicensed bands have bandwidth of an integer multiple of 20 MHz. For channel access and transmission in each unlicensed component carrier, a respective LBT function needs to be invoked.

Performing LBT Cat4 in each component carrier is the most conservative channel access and offers best coexistence. However, it would also lead to more time/spectrum waste since long and often listen intervals for each component carrier has to be performed. If a wireless base station (such as gNB) implementing carrier aggregation attempts to access multiple component carriers with LBT Cat4 (such as implementation of listen before talk function 1141 to acquire bandwidth BWP1 and implementation of listen before talk function 1142 to acquire bandwidth BWP2), in a manner as previously discussed, there is a chance that LBT procedure may be successful only on a subset of the component carriers. To enhance channel access, a wireless base station (gNB) may be configured to use LBT Cat4 on a first component carrier (such as associated with listen before talk function 1141) and a different LBT function (such as CAT2 or listen before talk function 1142) on another component carrier.

In one embodiment, a wireless station (such as gNB/UE) implementing carrier aggregation starts LBT Cat4 on one or more CCs. As soon as the associated back-off timer for the LBT of one CC expires (indicating a successful LBT Cat4 access), the gNB accesses the other component carriers simultaneously in a manner as previously discussed, assuming that no signal stronger than the EDT threshold level is detected in each of the other CCs. Effectively, this is equivalent that the LBT category for the remaining component carriers has a back-off time longer than the back-off time of LBT Cat2.

In yet further example embodiments, the first bandwidth of one or more frequency blocks represents a first component carrier component; the second bandwidth of one or more frequency blocks represents a second carrier component. Acquisition of the access rights to both the first bandwidth and the second bandwidth includes carrier aggregation of the first component carrier and the second component.

Note that, due to some independent processing in one component carrier versus another component carrier, the method for which one component carrier infers that the LBT has been successful in another CC may be left for implementation.

More specifically, an implementation signaling between the PHY/MAC processing entity of multiple CCs may be configured to carry a respective LBT-success signal associated with a listen before talk monitoring function. In one embodiment, the signaling amongst multiple component carriers includes information such as: channel/sub-band index that the CC operates at, LBT success status, etc.

In another implementation, a respective LBT mechanism (such as listen before talk function 1141, listen before talk function 1152, etc.) may be enhanced to infer that a detected signal that exceeds a second threshold EDT2 is in fact from a component carrier of the same device, hence indicating a successful LBT procedure in an adjacent component carrier. In one embodiment, a very high threshold level EDT2 may be implemented to detect a very close transmission, e.g. −30 dBm.

In accordance with further example embodiments, in a manner as previously discussed, the LBT function in a component carrier, such as component carrier CC1, initiates a back-off interval (e.g. based on LBT Cat4) and starts sensing the channel for any detected signal during a back-off interval (the listen interval). Component carrier CC1 continues sensing the channel given no signal above the corresponding threshold level (such as EDT) is detected. While waiting for the respective LBT interval to expire, if a signal larger than threshold level (such as EDT2) is detected, it may be inferred that the detected signal is from a nearby component carrier such as component carrier CC0, (indicating a successful LBT in CC0). In such an instance, component carrier CC1 may start transmission. Note that for this implementation it is assumed that CC1 has an auxiliary receiver for channel sensing in the same sub-band that CC0 operates.

Figure 15:
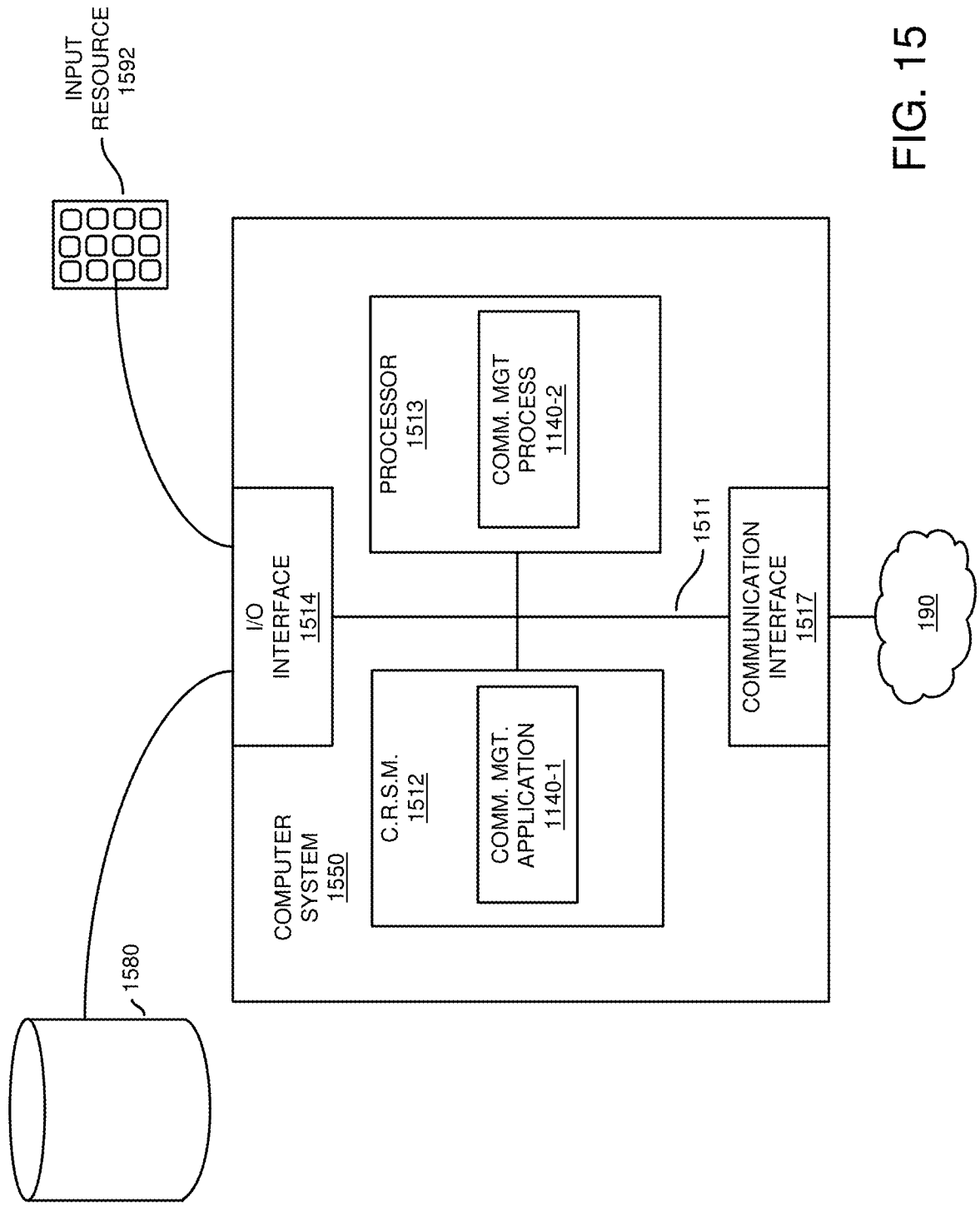
FIG. 15 is an example diagram illustrating example computer hardware and software operable to execute one or more operations according to embodiments herein.

FIG. 15 is an example block diagram of a computer system for implementing any of the operations as previously discussed according to embodiments herein.

Any of the resources (such as communication manager 1140, listen before talk function 1141, listen before talk function 1142, wireless base station 131, mobile communication device 151, mobile communication device 152, mobile communication device 161, etc.) as discussed herein can be configured to include computer processor hardware and/or corresponding executable instructions to carry out the different operations as discussed herein.

As shown, computer system 1550 of the present example includes interconnect 1511 coupling computer readable storage media 1512 such as a non-transitory type of media (which can be any suitable type of hardware storage medium in which digital information can be stored and or retrieved), a processor 1513 (computer processor hardware), I/O interface 1514, and a communications interface 1517.

I/O interface(s) 1514 supports connectivity to repository 1580 and input resource 1592.

Computer readable storage medium 1512 can be any hardware storage device such as memory, optical storage, hard drive, floppy disk, etc. In one embodiment, the computer readable storage medium 1512 stores instructions and/or data.

As shown, computer readable storage media 1512 can be encoded with communication manager application 1140-1 (e.g., including instructions) in a respective wireless station to carry out any of the operations as discussed herein.

During operation of one embodiment, processor 1513 accesses computer readable storage media 1512 via the use of interconnect 1511 in order to launch, run, execute, interpret or otherwise perform the instructions in communication manager application 1140-1 stored on computer readable storage medium 1512. Execution of the communication manager application 1140-1 produces communication manager process 1140-2 to carry out any of the operations and/or processes as discussed herein.

Those skilled in the art will understand that the computer system 1550 can include other processes and/or software and hardware components, such as an operating system that controls allocation and use of hardware resources to execute communication manager application 1140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1550 may reside at any location or can be included in any suitable resource in any network environment to implement functionality as discussed herein.

Functionality supported by the different resources will now be discussed via the flowchart in FIG. 16. Note that the steps in the flowcharts below can be executed in any suitable order.

Figure 16:
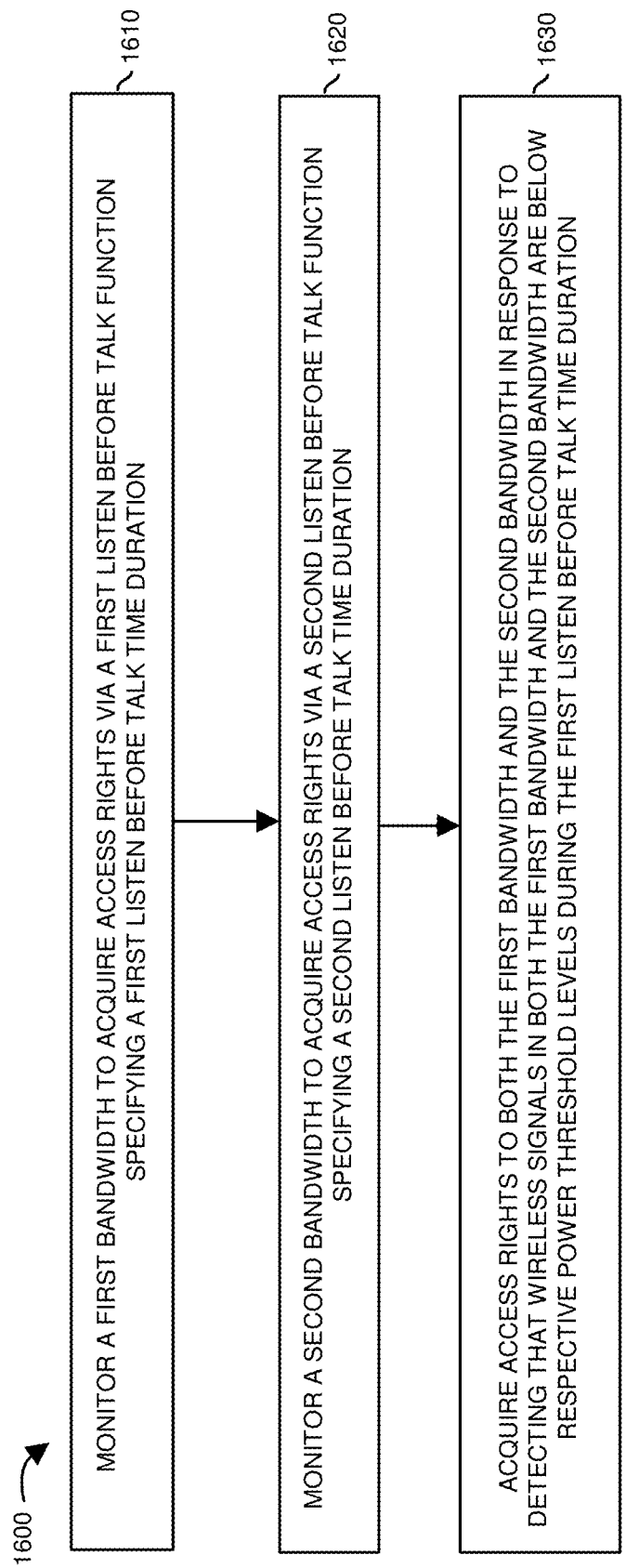
FIG. 16 is an example diagram illustrating a method according to embodiments herein.

FIG. 16 is a flowchart 1600 illustrating an example method according to embodiments herein. Note that there will be some overlap with respect to concepts as discussed above.

In processing operation 1610, via the first listen before talk function 1141, the communication manager 1140 (such as communication management hardware or communication management software) associated with wireless base station 131 monitors a first bandwidth (such as BWP1) to obtain respective access rights. The first listen before talk function 1141 implements a first listen before talk time duration to acquire the bandwidth BWP1.

In processing operation 1620, via the first listen before talk function 1142, the communication manager 1140 (such as communication management hardware or communication management software) associated with wireless base station 131 monitors a second bandwidth (such as BWP2) to obtain respective access rights. The second listen before talk function 1142 implements a second listen before talk time duration to acquire the bandwidth BWP2.

In processing operation 1630, the communication management hardware associated with wireless base station 131 acquires access rights to both the first bandwidth and the second bandwidth in response to detecting that a strength of corresponding monitored wireless signals received in both the first bandwidth and the second bandwidth are below respective energy threshold levels (such as TL1 and TL1, or TL1 and TL2) during the first listen before talk time duration (such as LBT1 time duration).

Third Embodiments

Embodiments herein include communication management hardware. During operation, each of multiple instance of the communication management hardware (such as associated with each respective mobile communication device) receives notification of a wireless channel scheduled for shared use amongst multiple mobile communication devices. A first mobile communication device (and corresponding communication management hardware) implements a first listen before talk function to acquire use of a portion (such as first time slot) of the shared wireless channel. For example, via implementation of a first listen before talk function, the first mobile communication device acquires use of a first time slot of the wireless channel scheduled for shared use. The communication management hardware associated with the second mobile communication device fails to acquire use of the first time slot because it detects use of the first time slot of the wireless channel by the first mobile communication device. Thereafter, the second mobile communication device monitors, via a second listen before talk function implemented by the communication management hardware, for non-use of a second time slot of the wireless channel to acquire use of the second time slot amongst the multiple mobile communication devices. If the first mobile communication device (or other mobile communication devices or wireless stations) do not use the second time slot in the allocated wireless channel, the second mobile communication device acquires the second time slot and communicates data in an uplink direction from the second mobile communication device to the wireless base station.

Now, more specifically, FIG. 17 is an example diagram illustrating of wireless channel resources (such as one or more timeslots) for use by a set of mobile communication devices according to embodiments herein.

As shown in this example embodiment, wireless network environment 100 includes network 190 (such as remote network such as the Internet), wireless base station 131, wireless base station 132, wireless base station 133, wireless base station 134, etc. Wireless base station 131 includes a communication management resource 1741 (a.k.a., communication management hardware and/or software) to perform processing operations associated with the wireless base station 131.

Network environment 100 further includes set of mobile communication devices 150.

In this example embodiment, the set of mobile communication devices 150 includes mobile communication device 151 (a.k.a., user equipment #1 or wireless station #1), mobile communication device 152 (a.k.a., user equipment #2 or wireless station #2), mobile communication device 153 (a.k.a., user equipment #3 or wireless station #3), etc.

In one nonlimiting example embodiment, each of the mobile communication devices in the set 150 is operated by a respective user. Each mobile communication device includes a respective display screen on which to display one or more images for viewing by the respective user based on received data over a respective wireless communication link from the wireless base station 131. For example, via one or more wireless communication links 127, the wireless base station 131 provides the mobile communication devices 150 access to remote network 190.

Wireless base station 131 includes one or more sets of antenna hardware to communicate with communication devices over respective wireless communication links. For example, the wireless base station 131 uses bandwidth BWP1 (such as first bandwidth) or other bandwidth to communicate over first antenna hardware 171 of wireless base station 131 with the multiple communication devices UE1, UE2, UE3, etc., over wireless communication links 127.

In one embodiment, wireless base station 131 and corresponding communication management resource 1741 is in communication with the first mobile communication device 151 via a first wireless communication link of the multiple wireless communication links 127; wireless base station 131 and corresponding communication management resource 1741 is in communication with the first mobile communication device 152 via a second wireless communication link of the multiple wireless links 127; wireless base station 131 and corresponding connection management resource 141 is in communication with the third mobile communication device 153 via a third wireless communication link of the wireless communication links 127; and so on.

Note that the resources as described herein such as wireless base station 131, communication management resource 1741, mobile communication devices, etc., can be implemented via hardware, executed software, or a combination of hardware and executed software.

More specifically, communication management resource 1741 (a.k.a., wireless base station 131) can be implemented as communication (connection) management hardware, executed communication (connection) management software, or a combination of communication management hardware and executed communication management software; wireless base station 131 can be implemented as wireless base station hardware, executed wireless base station software, or a combination of wireless base station hardware and executed wireless base station software; each mobile communication device (a.k.a., user equipment) can be implemented as mobile communication device hardware, executed mobile communication device software, or a combination of mobile communication device hardware and executed mobile communication device software; and so on.

As further discussed herein, the wireless base station 131 and corresponding communication management resource 1741 support wireless communication with the mobile communication devices via any suitable wireless communication protocol such as one or more of WiFi™, LTE (Long Term Evolution), LAA (Licensed Assisted Access), NR (New Radio), NR-U (New Radio Unlicensed), etc., in the same or different bandwidth. In certain instances, the wireless stations share use of the same wireless bandwidth (such as one or more wireless channels) to convey communications to one or more intended recipients in remote network 190.

As described herein, based on acquisition of wireless resources in any suitable manner, the wireless base station 131 initially receives access rights to use the first bandwidth BWP1 and assign use of same to the set of mobile communication devices 150.

As further shown in this example embodiment, via communications 1720, communication management resource 1741 associated with the wireless base station 131 assigns use of multiple wireless resources (such as timeslots 1701, 1702, 1703, 1704, 1705, 1706, etc.) associated with bandwidth BWP1 for shared use by the set of mobile communication devices 150 to communicate in the uplink to the wireless base station 131. As further discussed below, the mobile communication devices in the set 150 can be configured to compete with each other to acquire and use the respective timeslots associated with the wireless bandwidth BWP1.

In one embodiment, each of the mobile communication devices receives the notification (such as via communications 1720) of assigned wireless communication resources from wireless base station 131 or other suitable entity that controls use of the shared wireless channel.

Each of the mobile communication devices includes a respective communication management resource to support wireless communications. For example, mobile communication device 151 includes communication management resource 1771 to execute multiple different listen before talk functions 1761 (such as a first listen before talk function, second listen before talk function, etc.); mobile communication device 152 includes communication management resource 1772 to execute multiple different listen before talk functions 1762 (such as a first listen before talk function, second listen before talk function, etc.); mobile communication device 153 includes communication management resource 1773 to execute multiple different listen before talk functions 1763 (such as a first listen before talk function, second listen before talk function, etc.).

In one embodiment, the first listen before talk function (such as LBT1) is a first listen before talk protocol such as CAT 4 or other suitable protocol; the second listen before talk function (such as LBT2) is a second listen before talk protocol such as CAT 2 or other suitable protocol; and so on.

As further discussed below, one embodiment herein includes channel/medium sharing between NR-U UEs (such as mobile communication devices 151, 152, 153, etc.), in which a (first) UE initiates an uplink (UL) transmission after performing a Listen before talk protocol such as listen before talk function Cat 4. In one embodiment, the first mobile communication device 151 uses the first time slot 1701 to support wireless communications; thereafter, the set of resources (such as other unused timeslots) may be used by other members of the set of mobile communication devices 150 depending on availability.

In one nonlimiting example embodiment, to enable UE medium sharing, instead of contention among UEs, the following changes with respect to R16 can be implemented.

For example, a wireless base station 131 (such as gNB) configures two or more CG Resources (CGR) such as timeslots across the same BWPs (or sub-bands), where the first CGR starts one or more OFDM symbol(s) earlier than the subsequent CGRs. CGR1 (such as a first time slot of the bandwidth BWP1) is accessed by a first mobile communication device 151 using LBT CAT4 back-off interval time duration. CGR2 (such as a second time slot of bandwidth BWP2), is accessed by a second (guest) UE, using LBT Cat2 back-off interval time duration.

In one embodiment, in order to reduce collisions amongst the mobile communication devices using the same timeslots, a UE may be allowed to access either of the CGRs, but not both. Hence, the first UE that transmits in the first CGR1 (wireless resource such as first time slot) does not attempt to transmit in CGR2 (wireless resource such as second time slot). All mobile communication devices (configured to use CGR1 and CGR2) that have failed to access the first CGR1, may attempt to access and transmit in CGR2 if they acquire CGR2 with a respective appropriate LBT.

In accordance with further example embodiments, a mobile communication device that attempts to access the first CGR may not have its back-off timer interval reach zero in order to be allowed to access the first CGR. If the mobile communication device detects the first CGR is accessed (by another UE), then the UE may attempt to access the subsequent CGRs as a guest UE (and with LBT Cat2).

In one embodiment, the method to detect if another UE has accessed the first CGR is implementation-based, and may include comparing the energy information such as RSSI (Received Signal Strength Indicator) or RSRP (Reference Signal Received Power) of the monitored bandwidth BWP1 to one or more threshold levels. Additionally, or alternatively, embodiments herein include detecting use of a respective time slot via detecting presence reference signals such as DM-RS (Demodulation Reference Signal) or other suitable information. In one embodiment, DM-RS refers to a demodulation reference signal transmitted by respective user equipment. It is used by a receiver for radio channel estimation for demodulation of the associated physical channel.

In accordance with further example embodiments, the mobile communication device performs LBT Cat2 before the next CGR and if successful, the UE transmits in the next CGR.

To enhance coexistence, a guest mobile communication device may attempt to use CAT2 only if the detected RSSI/RSRP during the first CGR (time slot) is larger than a configurable threshold. By setting the threshold to a larger value, a wireless base station (such as gNB) ensures that mobile communication devices in close proximity share the channel.

In one embodiment, channel sharing amongst multiple different instances of user equipment includes implementing the following rules: i) the maximum duration should be less than maximum COT (Channel Occupancy Time) or MCOT duration, ii) the number of UEs that can share the channel with the first UE may be limited, iii) the gap between transmission of the first UE and that of the 2nd UE (with LBT CAT2) may be subject to a max value.

More specific examples of sharing use of the bandwidth BWP1 are discussed below.

Figure 18:
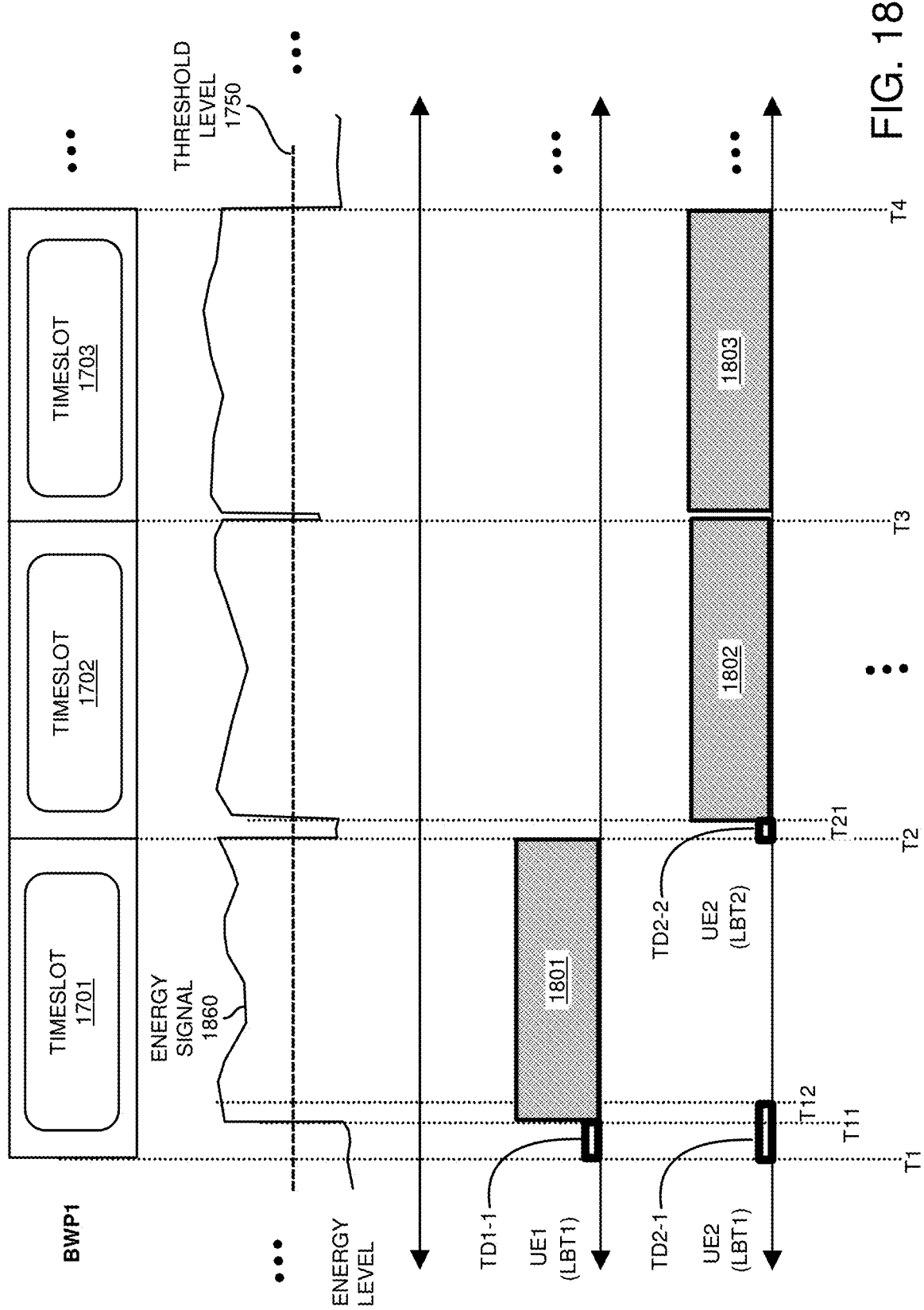
FIG. 18 is an example diagram illustrating acquisition and use of available time slots in an allocated wireless channel according to embodiments herein.

FIG. 18 is an example diagram illustrating acquisition and use of available time slots amongst multiple mobile communication devices according to embodiments herein.

As previously discussed, the communication management resource 1741 allocates use of the wireless channel BWP1 and corresponding timeslots (or configured grant resources) by the multiple mobile communication devices 151, 152, 153, etc.

Assume in this example embodiment that at least the mobile communication device 151 and 152 desires to acquire use of the first time slot 1701 (such as first configured grant resource) associated with bandwidth BWP1 to communicate in an uplink direction to the wireless base station 131.

In such an instance, each of the mobile communication devices initially implements a first listen before talk function LBT1 to attempt to acquire the first time slot and communicate in an uplink direction to the wireless base station 131.

More specifically, at time T1, the first mobile communication device 151 (UE1) implements LBT1 and time duration TD1-1 (listen before talk time interval) to acquire use of the time slot 1701; at time T1, the second mobile communication device 152 (UE2) implements LBT1 and time duration TD2-1 (listen before talk time interval) to acquire use of the time slot 1701; and so on.

In one embodiment, the time duration used by the respective mobile communication device is a random time duration value. The listen before talk function LBT1 associated with the mobile communication device 151 generates a first random listen before talk interval time duration TD1-1; The listen before talk function LBT1 associated with the mobile communication device 152 generates a second random listen before talk interval time duration TD2-1;

In this example embodiment, the time duration TD1-1 is a shorter duration with respect to the time duration TD2-1.

Each of the mobile communication devices 151, 152, etc., attempting to acquire the time slot 1701 monitors for presence of wireless energy in the bandwidth BWP1 prior to acquisition.

In this example embodiment, assume that the energy signal 1860 represents a respective energy level associated with the bandwidth BWP1 in the network environment 100 over time. Each of the mobile communication devices 151, 152, 153, etc., monitors a magnitude of the energy. The amount of energy in the bandwidth BWP1 detected by each of the mobile communication devices is approximately equal to energy signal 1860, more or less as the actual energy at each location may vary.

Because the time duration TD1-1 is less than time duration TD2-1, the mobile communication device 151 detects that the detected energy level of wireless energy in the bandwidth BWP1 is less than the energy threshold level 1750 for an appropriate amount of time to acquire use of the first time slot of the allocated bandwidth BWP1. At around time T11, because the first mobile communication device 151 (UE1) acquires the wireless bandwidth BWP1 in time slot 1701, the mobile communication device 151 transmits communication 1801 in time slot 1701 in an uplink direction from the mobile communication device 151 to the wireless base station 131. As shown, at time T11, this causes the energy signal 1860 to increase above the threshold level 1750.

As previously discussed, the mobile communication device 152 (UE2) also monitors the energy present in the bandwidth BWP1. Because the time duration TD2-1 is greater than time duration TD1-1, between time T11 and T12, the mobile communication device 152 detects that the energy associated with the bandwidth BWP1 is greater than the threshold level 1750. The detection of the energy above the threshold level 1750 notifies the mobile communication device 152 that another mobile communication device in the set of mobile communication devices 150 sharing use of the allocated time slots associated with bandwidth BWP1 has acquired intro uses the time slot 1701. In such an instance, the mobile communication device 152 does not transmit wireless communications in an uplink direction to the wireless base station 131 in time slot 1701 between time T11 and time T2.

However, at time T2, the mobile communication device 151 discontinues using the wireless bandwidth BWP1.

The mobile communication device 152 (UE2) and potentially one or more other mobile communication devices monitor the energy present in the bandwidth BWP1 after time T2 to acquire use of the wireless bandwidth BWP1.

In this example embodiment, the mobile communication device 152 (UE2) implements a second listen before talk function LBT2 (such as instead of the first listen before talk function LBT1) to acquire the time slot 1702. Because the mobile communication device 151 discontinues use of the bandwidth BWP1 to communicate with the wireless base station 131 at time T2, the mobile communication device 152 detects that the energy level of wireless communications in bandwidth BWP1 is less than the threshold level 1750 for the entire time duration TD2-2. The detection of the energy below the threshold level 1750 notifies the mobile communication device 152 that no other mobile communication device in the set of mobile communication devices 150 is using the bandwidth BWP1. In such an instance, the mobile communication device 152 acquires the time slot 1701 and transmits wireless communications 1802 in an uplink direction to the wireless base station 131 in time slot 1702 between time T21 and time T3.

As further shown, the mobile communication device 152 also wirelessly transmits communications 1803 in time slot 1703 to the wireless base station 131. In one embodiment, the mobile communication device 152 does not need to perform another listen before talk function after acquiring the wireless bandwidth BWP1 (in time slot 1702) after time T2.

Alternatively, note that each of the mobile communication device in the set 150 may need to implement a listen before talk function at the beginning of each time slot to acquire a respective time slot prior to use.

Thus, during operation, the communication management hardware of mobile communication devices receives notification of a wireless channel BWP1 scheduled for shared use amongst multiple mobile communication devices. As previously discussed, a first mobile communication device 151 implements a first listen before talk function LBT1 to acquire use of a portion (such as time slot 1701) of the shared wireless channel. For example, via implementation of a first listen before talk function, the first mobile communication device 151 acquires use of time slot 1701 of the wireless channel BWP1 scheduled for shared use. The connection management resource associated with the second mobile communication device 152 fails to acquire use of the first time slot 1701 and detects use of the first time slot of the wireless channel by the first mobile communication device 151.

In one embodiment, via the mobile communication device 152 implementing the first listen before talk function LBT1 detects that the first time slot 1701 is used by a member of the mobile communication devices (set of mobile communication devices 150) allocated use of the wireless channel BWP1.

The second mobile communication device 152 further monitors, via a second listen before talk function LBT2, for non-use of the second time slot 1702 of the wireless channel BWP1 to acquire use of the second time slot 1702 amongst the multiple mobile communication devices. Thus, since the first mobile communication device 151 does not use the second time slot 1702 to communicate in the uplink to the wireless base station 131, the second mobile communication device 152 is able to use the second time slot 1702 to communicate over a respective wireless communication link with the wireless base station 131.

In accordance with further example embodiments, the second listen before talk function (such as LBT2) implements a shorter listen before talk interval (time duration TD2-2) than the first listen before talk function LBT1 (such as time duration TD2-1). Thus, as previously discussed, the mobile communication device 151 acquires the first time slot 1701 via the first listen before talk function LBT1. The second listen before talk function LBT2 is a more lenient (such as shorter listen before talk duration, higher threshold level 1750, etc.) listen before talk protocol than the first listen before talk function.

In one embodiment, via the respective communication management hardware associated with the mobile communication devices, the mobile communication device 152 implements the second listen before talk function in response to detecting that a magnitude of wireless energy associated with use of the first time slot 1701 by the first mobile communication device 151 is above a wireless energy threshold level 1750.

In further example embodiments, the communication management hardware associated with the mobile communication device 152 implements the first listen before talk function in the first time slot 1701 prior to implementing the second listen before talk function in the second time slot 1702. However, as previously discussed, the first mobile communication device 151 implemented a shorter listen before talk interval time (such as time duration TD1-1) than the second mobile communication device 152 (time duration TD2-1) in the first time slot 1702 and therefore acquired the first time slot 1701 of the shared wireless channel (BWP1) before the second mobile communication device 152 was able to acquire the first time slot 1701.

In yet further example embodiments, a gap between the first time slot 1701 and the second time slot 1702 is below a predetermined time threshold value. In such an instance, because the gap is below a predetermined time threshold value, the second mobile communication device 152 can acquire the second time slot 1702 via implementation of the second listen before talk function LBT2 instead of the first listen before talk function LBT1.

In still further embodiments, the first mobile communication device 151 acquires use of the first time slot 1701 via implementation of the first listen before talk function LBT1. In one embodiment, acquisition of the first time slot 1701 results in acquisition of the second time slot 1702 as well. However, as previously discussed, if the second mobile communication device 152 detects that the second time slot 1701 acquired by the first mobile communication device 151 is not used by the first mobile communication device 151 or other mobile communication device, in a manner as previously discussed, the second mobile communication device 152 acquires use of the second time slot 1702 to communicate with the wireless base station 131.

Figure 19:
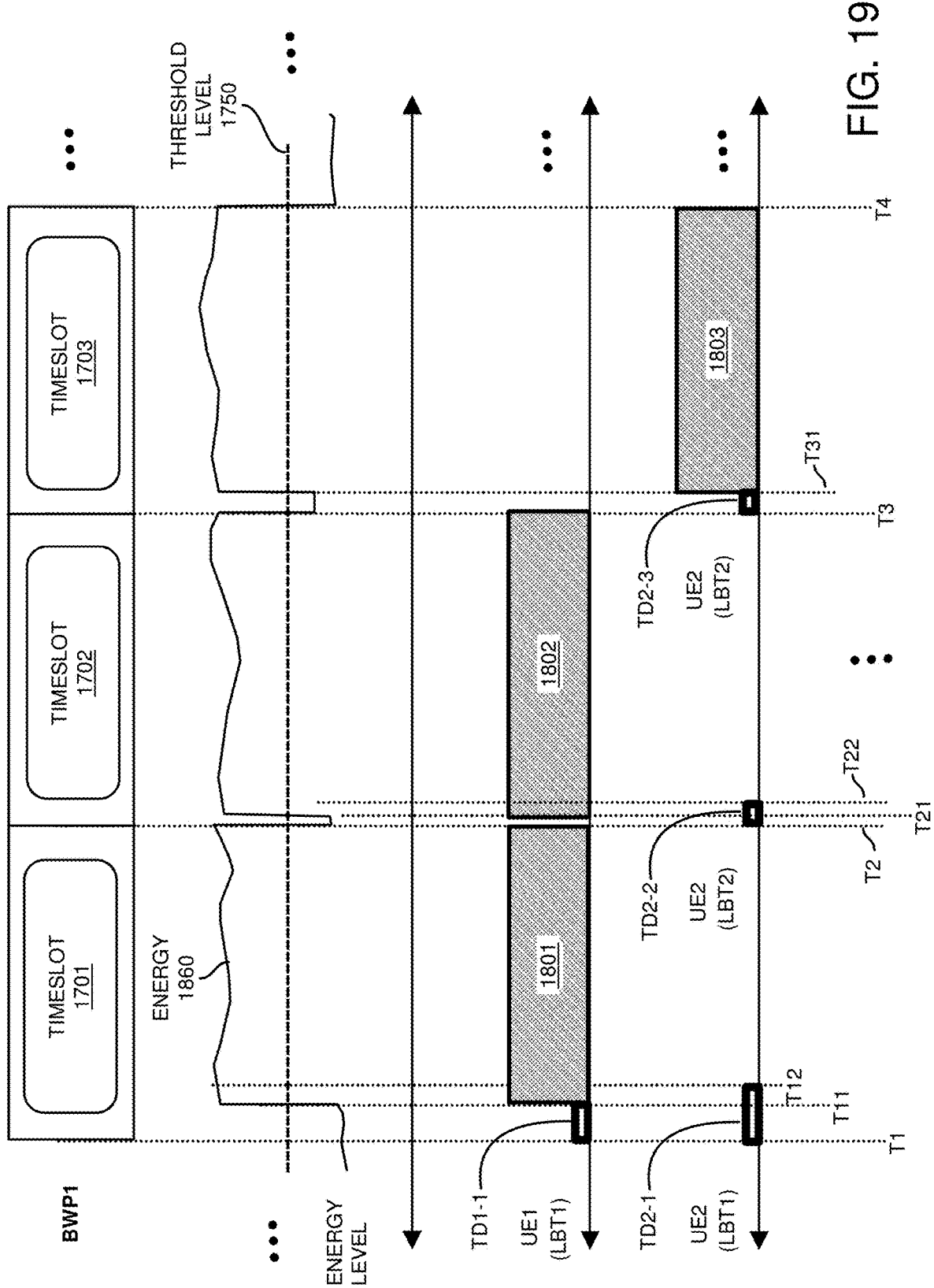
FIG. 19 is an example diagram illustrating acquisition and use of available time slots amongst multiple mobile communication devices according to embodiments herein.

FIG. 19 is an example diagram illustrating acquisition of available time slots in the allocated wireless channel resources amongst multiple mobile communication devices according to embodiments herein.

As previously discussed, the communication management resource 1741 allocates use of the wireless channel BWP1 by the multiple mobile communication devices 151, 152, 153, etc., via communications 1720.

Assume in this example embodiment that at least the mobile communication device 151 and 152 desires to acquire use of the first time slot 1701 (such as first configured grant resource) associated with bandwidth BWP1 to communicate in an uplink direction to the wireless base station 131.

In this example embodiment, each of the mobile communication devices initially implements a first listen before talk function LBT1 to attempt to acquire the first time slot and communicate in an uplink direction to the wireless base station 131.

More specifically, at time T1, the first mobile communication device 151 (UE1) implements LBT1 and time duration TD1-1 to acquire use of the time slot 1701; at time T1, the second mobile communication device 152 (UE2) implements LBT1 and time duration TD2-1 to acquire use of the time slot 1701; and so on.

In one embodiment, the time duration used by the respective mobile communication device is a random time duration value generated by each respective listen before talk function. In this example embodiment, the time duration TD1-1 is a shorter duration with respect to the time duration TD2-1.

Each of the mobile communication devices 151, 152, etc., attempting to acquire the time slot 1701 monitors for presence of wireless energy in the bandwidth BWP1 prior to acquisition. In this example embodiment, assume that the energy signal 1860 represents a respective energy level associated with the bandwidth BWP1 in the network environment 100 over time. Each of the mobile communication devices 151, 152, 153, etc., monitors the wireless energy with respective antenna hardware of the mobile communication device. The amount of energy in the bandwidth BWP1 detected by each of the mobile communication devices is approximately equal to energy signal 1860, more or less, as the actual energy at each location of the mobile communication devices may vary.

Because the time duration TD1-1 is less than time duration TD2-1, the mobile communication device 151 detects that the detected energy level of wireless energy in the bandwidth BWP1 is less than the energy threshold level 1750 for an appropriate amount of time to acquire use of the first time slot of the allocated bandwidth BWP1. At around time T11, because the first mobile communication device 151 (UE1) acquires the wireless bandwidth BWP1 in time slot 1701, the mobile communication device 151 transmits communication 1801 in time slot 1701 in an uplink direction from the mobile communication device 151 to the wireless base station 131. As shown, at time T11, the transmission of wireless communications 1801 from mobile communication device 151 causes the energy signal 1860 to increase above the threshold level 1750.

As previously discussed, the mobile communication device 152 (UE2) also monitors the energy present in the bandwidth BWP1. Because the time duration TD2-1 is greater than time duration TD 1-1, at or around time T11 to T12, the mobile communication device 152 detects that the energy associated with the bandwidth BWP1 is greater than the threshold level 1750. The detection of the energy above the threshold level 1750 notifies the mobile communication device 152 that another mobile communication device (mobile communication device 151 in this example) in the set of mobile communication devices 150 has acquired use and is using of the time slot 1701.

In such an instance, the mobile communication device 152 does not transmit wireless communications in an uplink direction to the wireless base station 131 in time slot 1701 between time T11 and time T2 because the time slot is not available.

In this example embodiment, at time T2, the mobile communication device 151 continues using the wireless bandwidth BWP1 in time slot 1702.

The mobile communication device 152 (UE2) and potentially one or more other mobile communication devices monitor the energy present in the bandwidth BWP1 at or around time T2 to acquire use of the wireless bandwidth BWP1. In this example embodiment, the mobile communication device 152 (UE2) implements a second listen before talk function LBT2 to acquire the time slot 1702.

Because the mobile communication device 151 continues use of the bandwidth BWP1 to communicate with the wireless base station 131 at time T2 and in time slot 1702, the mobile communication device 152 detects that the energy level of wireless communications in bandwidth BWP1 is greater than the threshold level 1750 during the time duration TD2-2. The detection of the energy above the threshold level 1750 by the mobile communication device 152 notifies the mobile communication device 152 that another mobile communication device in the set of mobile communication devices 150 is using the bandwidth BWP1. In such an instance, the mobile communication device 152 does not acquire the bandwidth BWP1 and does not transmit wireless communications in an uplink direction to the wireless base station 131 in time slot 1702 between time T21 and time T3.

As further shown, the mobile communication device 151 also wirelessly transmits communications 1802 in time slot

1702 to the wireless base station 131. In one embodiment, the mobile communication device 151 does not need to perform another listen before talk function after acquiring the wireless bandwidth BWP1 after time T2 because the mobile communication device 151 acquired the bandwidth BWP1 via the listen before talk function at or around time T1.

The mobile communication device 152 (UE2) and potentially one or more other mobile communication devices monitor the energy present in the bandwidth BWP1 after time T3. In this example embodiment, the mobile communication device 152 (UE2) implements a second listen before talk function LBT2 to acquire the time slot 1703 if available. Because the mobile communication device 151 discontinues use of the bandwidth BWP1 to communicate with the wireless base station 131 at time T3, the mobile communication device 152 detects that the energy level of wireless communications in bandwidth BWP1 is less than the threshold level 1750 for the entire time duration TD2-3.

The time duration for each listen before talk function LBT2 is a fixed or random value.

The detection of the energy below the threshold level 1750 by the mobile communication device 152 notifies the mobile communication device 152 that no other mobile communication device in the set of mobile communication devices in the set 150 is using the bandwidth BWP1. In such an instance, the mobile communication device 152 transmits wireless communications 1803 in an uplink direction to the wireless base station 131 in time slot 1703 between time T31 and time T4.

As further shown, the mobile communication device 152 also wirelessly transmits communications 1803 in time slot 1703 to the wireless base station 131.

Figure 20:
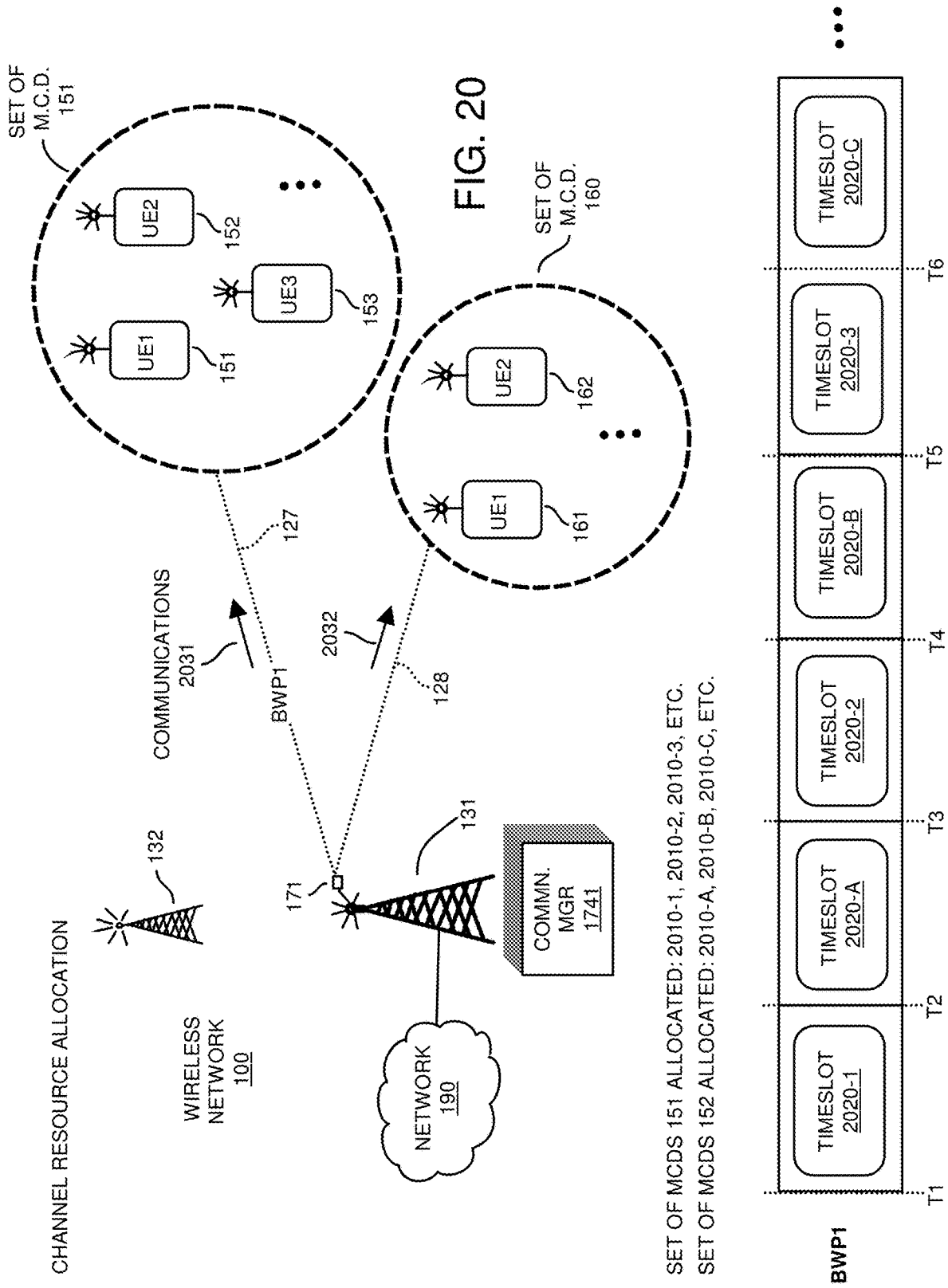
FIG. 20 is an example diagram illustrating allocation of wireless channel resources (such as one or more timeslots) for use by multiple sets of mobile communication devices according to embodiments herein.

FIG. 20 is an example diagram illustrating shared use of wireless channel resources (such as one or more timeslots) by a set of mobile communication devices according to embodiments herein.

In one embodiment, as shown in FIG. 20, the wireless channel BWP1 scheduled for use by the multiple mobile communication devices includes a first set of timeslots 2010-1, 2010-2, 2010-3, etc., interleaved amongst a second set of timeslots 2010-A, 2010-B, 2010-C, etc.

In this example embodiment, a first set of mobile communication devices 150 including mobile communication device 151, mobile communication device 152, mobile communication device 153, etc., is assigned shared use of the first set of timeslots 2010-1, 2010-2, 2010-3, etc. The second set of timeslots is scheduled for shared use by a second set of mobile communication devices 160 including mobile communication device 161, 162, etc.

Wireless communications 2031 from the wireless base station 131 notify each member in the first set of mobile communication devices that timeslots 2010-1, 2010-2, 2010-3, etc., are available to the first mobile communication devices 151, 152, 153, etc. Wireless communications 2032 from the wireless base station 131 notify each member in the second set of mobile communication devices that timeslots 2010-A, 2010-B, 2010-C, etc., are available to the second mobile communication devices 161, 162, etc.

Figure 21:
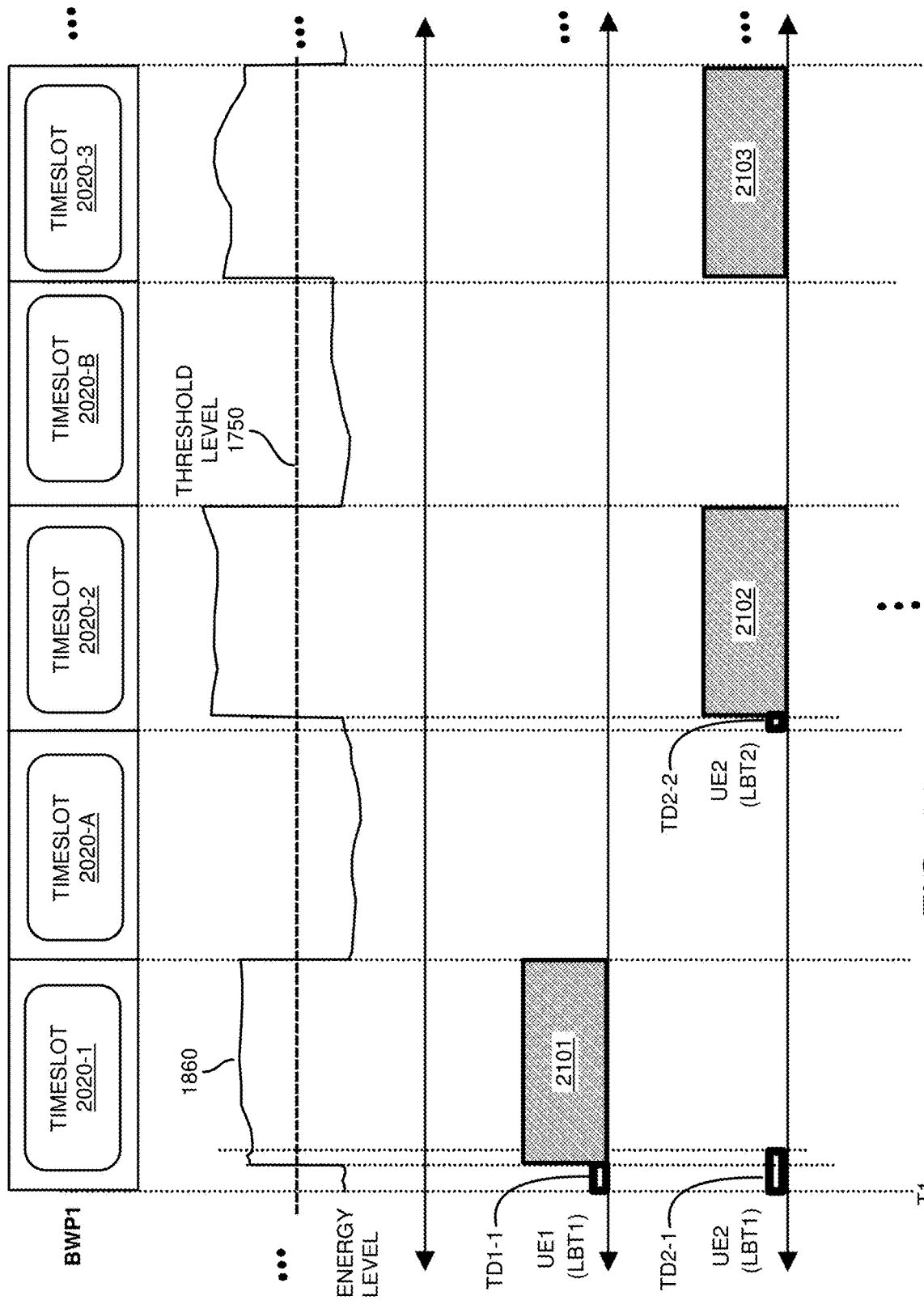
FIG. 21 is an example diagram illustrating acquisition and use of available time slots amongst multiple mobile communication devices according to embodiments herein.

FIG. 21 is an example diagram illustrating acquisition of available time slots in the allocated wireless channel resources amongst multiple mobile communication devices according to embodiments herein.

In this embodiment, in a similar manner as previously discussed, each of the mobile communication devices competes for use of the available wireless time slots in the allocated wireless bandwidth BWP1. However, in this example embodiment, the members of the first set of mobile communication devices 151, 152, 153, etc., compete for use of time slots 2010; the members of the second set of mobile communication devices 161, 162, etc., compete for use of time slots 2020.

More specifically, in a similar manner as previously discussed, mobile communication device 151 acquires use of time slot 2020-1 before mobile communication device 152. Mobile communication device 151 transmits communications 2101 in time slot 2020-1 to the wireless base station 131 over a respective wireless communication link.

Mobile communication device 152 acquires use of time slot 2020-2 before any other mobile communication device. Mobile communication device 152 transmits communications 2102 in time slot 2020-2 to the wireless base station 131 over a respective wireless communication link.

Mobile communication device 152 continues to use time slot 2020-3 to communicate data via communications 2103 in an uplink direction from the mobile communication device 152 to the wireless base station 131.

Figure 22:
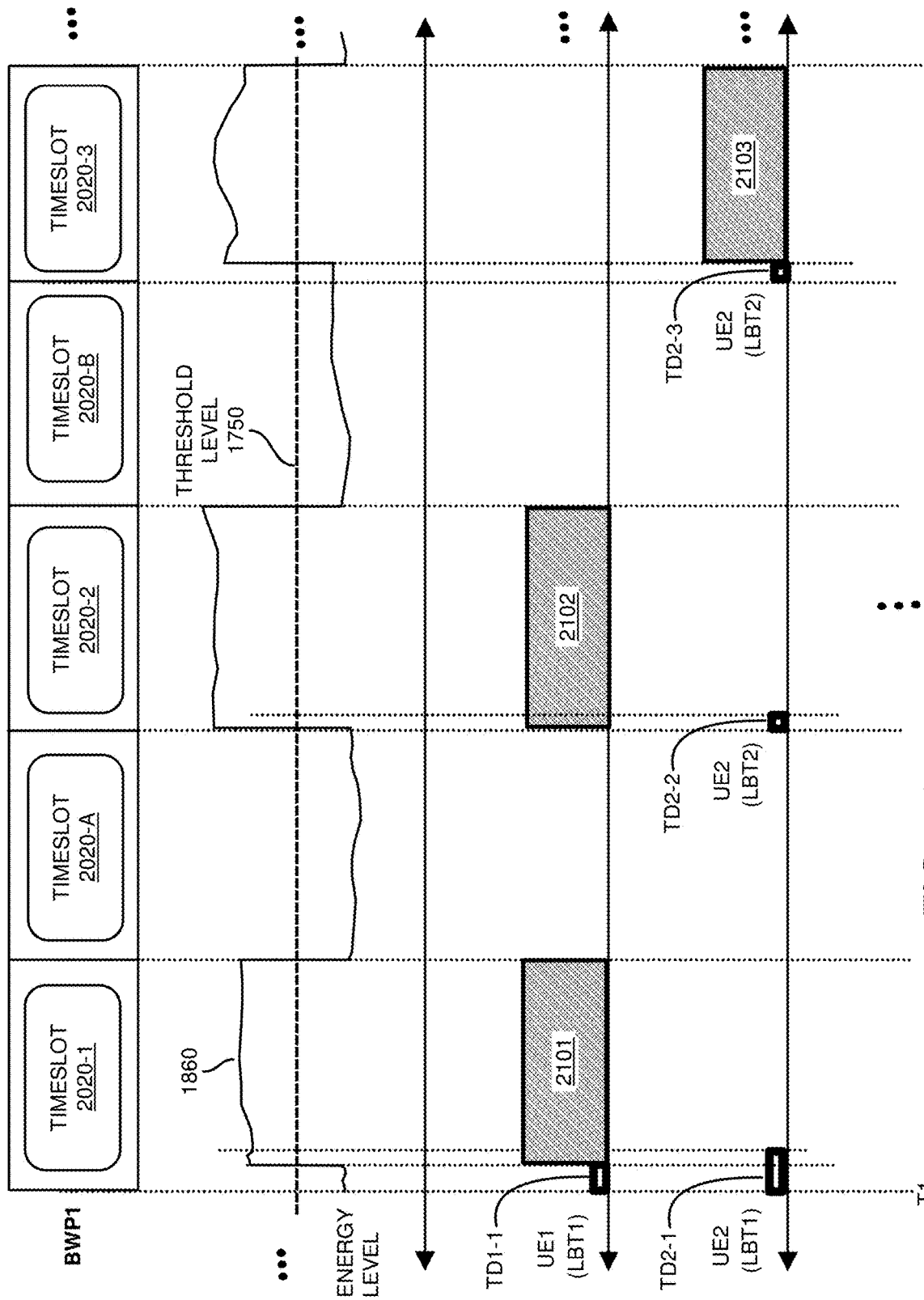
FIG. 22 is an example diagram illustrating acquisition and use of available time slots amongst multiple mobile communication devices according to embodiments herein.

FIG. 22 is an example diagram illustrating acquisition of available time slots in the allocated wireless channel resources amongst multiple mobile communication devices according to embodiments herein.

In this embodiment, in a similar manner as previously discussed, each of the mobile communication devices competes for use of the available wireless time slots in the allocated wireless bandwidth BWP1. However, in this example embodiment, the members of the first set of mobile communication devices 151, 152, 153, etc., compete for use of time slots 2020-1, 2020-2, 2020-3, etc.; the members of the second set of mobile communication devices 161, 162, etc., compete for use of time slots 2020-A, 2020-B, 2020-C, etc.

More specifically, in a similar manner as previously discussed, mobile communication device 151 acquires use of time slot 2020-1 before mobile communication device 152. Mobile communication device 151 transmits communications 2101 in time slot 2020-1 to the wireless base station 131 over a respective wireless communication link.

Mobile communication device 151 continues to use time slot 2020-2. Mobile communication device 151 transmits communications 2102 in time slot 2020-2 to the wireless base station 131 over a respective wireless communication link. Mobile communication device 152 detects use of the wireless channel via listen before talk LBT2 at the beginning of time slot 2020-2.

Mobile communication device 151 continues to use time slot 2020-2 to communicate data in an uplink direction from the mobile communication device 151 to the wireless base station 131. In such an instance, the mobile communication device 152 is unable to acquire and use the time slot 2020-2.

Via implementation of listen before talk function LBT2, the mobile communication device 152 acquires use of time slot 2020-3 before any other mobile communication device 152 and transmits communications 2103 in time slot 2020-3 to the wireless base station 131 over a respective wireless communication link.

Figure 23:
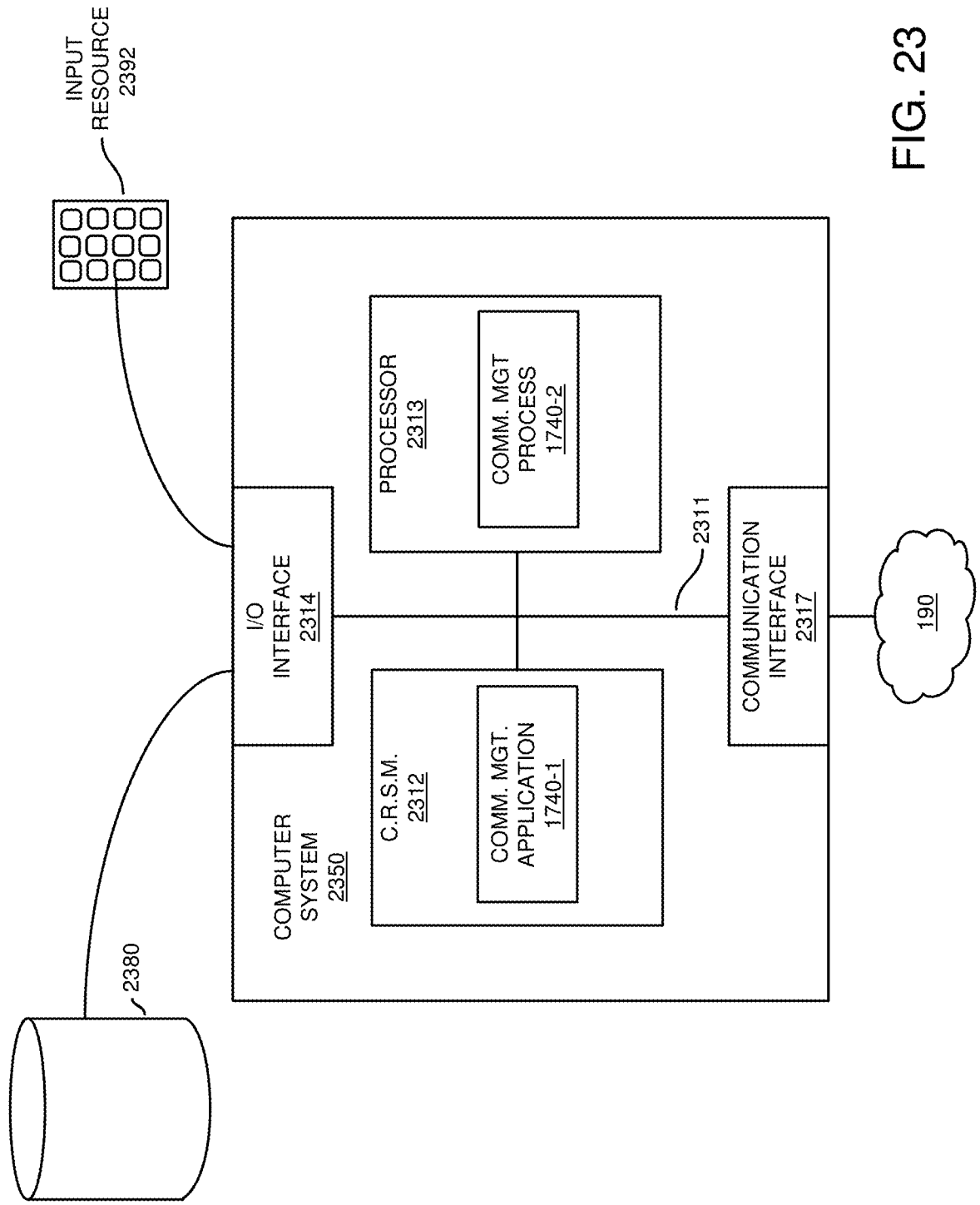
FIG. 23 is an example diagram illustrating example computer hardware and software operable to execute one or more operations according to embodiments herein.

FIG. 23 is an example block diagram of a computer system for implementing any of the operations as previously discussed according to embodiments herein.

Any of the resources (such as communication manager 1741, listen before talk functions 1761, 1762, 1763, wireless base station 131, mobile communication device 151, mobile communication device 152, mobile communication device 161, communication management resources 1771, 1772, 1773, etc.) as discussed herein can be configured to include computer processor hardware and/or corresponding executable instructions to carry out the different operations as discussed herein.

As shown, computer system 2350 of the present example includes interconnect 2311 coupling computer readable storage media 2312 such as a non-transitory type of media (which can be any suitable type of hardware storage medium in which digital information can be stored and or retrieved), a processor 2313 (computer processor hardware), I/O interface 2314, and a communications interface 2317.

I/O interface(s) 2314 supports connectivity to repository 2380 and input resource 2392.

Computer readable storage medium 2312 can be any hardware storage device such as memory, optical storage, hard drive, floppy disk, etc. In one embodiment, the computer readable storage medium 2312 stores instructions and/or data.

As shown, computer readable storage media 2312 can be encoded with communication manager application 1740-1 (e.g., including instructions) in a respective wireless station (such as each of the mobile communication devices 151, 152, 153, etc., 161, 162, etc.) to carry out any of the operations as discussed herein.

During operation of one embodiment, processor 2313 accesses computer readable storage media 2312 via the use of interconnect 2311 in order to launch, run, execute, interpret or otherwise perform the instructions in communication manager application 1740-1 stored on computer readable storage medium 2312. Execution of the communication manager application 1140-1 produces communication manager process 1740-2 to carry out any of the operations and/or processes as discussed herein.

Those skilled in the art will understand that the computer system 2350 can include other processes and/or software and hardware components, such as an operating system that controls allocation and use of hardware resources to execute communication manager application 1740-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 2350 may reside at any location or can be included in any suitable resource in any network environment to implement functionality as discussed herein.

Functionality supported by the different resources will now be discussed via the flowchart in FIG. 24. Note that the steps in the flowcharts below can be executed in any suitable order.

Figure 24:
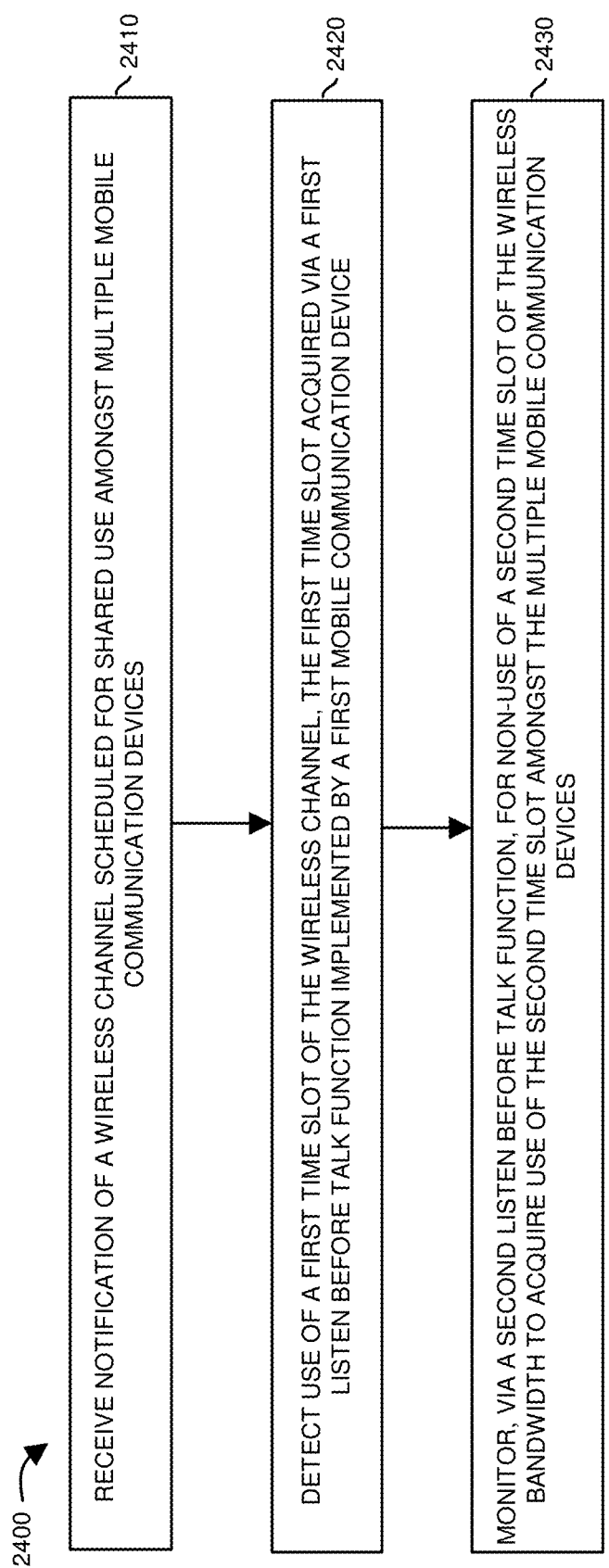
FIG. 24 is an example diagram illustrating a method according to embodiments herein.

FIG. 24 is a flowchart 2400 illustrating an example method according to embodiments herein. Note that there will be some overlap with respect to concepts as discussed above.

In processing operation 2410, each of the communication management resources 1771, 1772, 1773, etc., associated with mobile communication devices receives notification of a wireless channel (such as bandwidth BWP1) scheduled for shared use amongst multiple mobile communication devices in the set of mobile communication devices 150.

In processing operation 2420, the mobile communication device 152 (UE2) detects use of a first time slot 1701 of the wireless channel. The mobile communication device 151 (UE1) acquires the first time slot 1701 via implementing a first listen before talk function (listen before talk function #1).

In processing operation 2430, via a second listen before talk function (listen before talk function #2), the mobile communication device 152 monitors for non-use of a second time slot 1702 of the wireless channel to acquire use of the second time slot 1702 amongst the multiple mobile communication devices 151, 152, 153, etc.

Note again that techniques herein are well suited to facilitate acquisition and shared use of multiple wireless channels and wireless channel resources (such as timeslots) in a network environment such as via multiple listen before talk functions. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   monitoring, via listen before talk operations, both a first bandwidth and a second bandwidth to transmit wireless communications in a network environment;
   receiving access rights to use the first bandwidth prior to receiving access rights to use the second bandwidth; and
   temporally aligning use of the first bandwidth and the second bandwidth via communication of a wireless message over the first bandwidth.

2. The method as in claim 1, wherein the wireless message is a grant of use message of the first bandwidth communicated from a wireless base station to a first mobile communication device.

3. The method as in claim 2 further comprising:
   communicating the grant of use message to the first mobile communication device in a window of time between receiving the access rights to use the first bandwidth and receiving the access rights to use the second bandwidth.

4. The method as in claim 3, wherein the grant of use of the first bandwidth by the first mobile communication device prevents a competing wireless station with respect to the wireless base station from obtaining access rights to the first bandwidth in the window of time.

5. The method as in claim 3 further comprising:
   assigning the first bandwidth for use by a first set of mobile communication devices in communication with the wireless base station, the first set of mobile communication devices including the first mobile communication device; and
   assigning the second bandwidth for use by a second set of mobile communication devices in communication with the wireless base station.

6. The method as in claim 1, wherein the wireless message indicates a grant of use of the first bandwidth, the method further comprising:
   in a first time slot, communicating the wireless message from a wireless base station to a first mobile communication device, the wireless message indicating allocation of the first bandwidth to the first mobile communication device to communicate in an uplink direction from the mobile communication device to the wireless base station.

7. The method as in claim 6, wherein the wireless base station does not yet have access rights to use the second bandwidth in the first time slot.

8. The method as in claim 6 further comprising:
   in a second time slot following the first time slot, via wireless communication of a revoke grant message, revoking the grant of use of the first wireless bandwidth to the first mobile communication device as indicated by the wireless message, the revoked grant of use indicating deallocation of the first bandwidth from the first mobile communication device to communicate in an uplink direction from the mobile communication device to the wireless base station.

9. The method as in claim 8, wherein the wireless base station has access rights to use the second bandwidth in the second time slot.

10. The method as in claim 6 further comprising:
    communicating the wireless message from the wireless base station over a control channel monitored by multiple mobile communication devices that share use of the first bandwidth.

11. A system comprising:
    a wireless base station operative to:
       monitor, via listen before talk operations, both a first bandwidth and a second bandwidth to transmit wireless communications in a network environment;
       receive access rights to use the first bandwidth prior to receiving access rights to use the second bandwidth; and
       temporally align use of the first bandwidth and the second bandwidth via communication of a wireless message over the first bandwidth.

12. The system as in claim 11, wherein the wireless message is a grant of use message of the first bandwidth communicated from the wireless base station to a first mobile communication device.

13. The system as in claim 12, wherein the wireless base station is further operative to:
    communicate the grant of use message to the first mobile communication device in a window of time between receiving the access rights to use the first bandwidth and receiving the access rights to use the second bandwidth.

14. The system as in claim 13, wherein the grant of use of the first bandwidth by the first mobile communication device prevents a competing wireless station with respect to the wireless base station from obtaining access rights to the first bandwidth in the window of time.

15. The system as in claim 13, wherein the wireless base station is further operative to:
    assign the first bandwidth for use by a first set of mobile communication devices in communication with the wireless base station, the first set of mobile communication devices including the first mobile communication device; and
    assign the second bandwidth for use by a second set of mobile communication devices in communication with the wireless base station.

16. The system as in claim 11, wherein the wireless message indicates a grant of use of the first bandwidth, the wireless base station further operative to:
    in a first time slot, communicate the wireless message from a wireless base station to a first mobile communication device, the wireless message indicating allocation of the first bandwidth to the first mobile communication device to communicate in an uplink direction from the mobile communication device to the wireless base station.

17. The system as in claim 16, wherein the wireless base station does not yet have access rights to use the second bandwidth in the first time slot.

18. The system as in claim 16, wherein the wireless base station is further operative to:
    in a second time slot following the first time slot, via wireless communication of a revoke grant message, revoke the grant of use of the first wireless bandwidth to the first mobile communication device as indicated by the wireless message, the revoked grant of use indicating deallocation of the first bandwidth from the first mobile communication device to communicate in an uplink direction from the mobile communication device to the wireless base station.

19. The system as in claim 18, wherein the wireless base station has access rights to use the second bandwidth in the second time slot.

20. The system as in claim 16, wherein the wireless base station is further operative to:
communicate the wireless message from the wireless base station over a control channel monitored by multiple mobile communication devices that share use of the first bandwidth.

21. Computer-readable storage hardware having instructions stored thereon, the instructions, when carried out by computer processor hardware, cause the computer processor hardware to:
monitor, via listen before talk operations, both a first bandwidth and a second bandwidth to transmit wireless communications in a network environment;
receive access rights to use the first bandwidth prior to receiving access rights to use the second bandwidth; and
temporally align use of the first bandwidth and the second bandwidth via communication of a wireless message over the first bandwidth.

* * * * *